US010042660B2

(12) United States Patent
Wagner et al.

(10) Patent No.: US 10,042,660 B2
(45) Date of Patent: Aug. 7, 2018

(54) MANAGEMENT OF PERIODIC REQUESTS FOR COMPUTE CAPACITY

(71) Applicant: Amazon Technologies, Inc., Seattle, WA (US)

(72) Inventors: Timothy Allen Wagner, Seattle, WA (US); Scott Daniel Wisniewski, Edmonds, WA (US); Marc John Brooker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 49 days.

(21) Appl. No.: 14/871,368

(22) Filed: Sep. 30, 2015

(65) Prior Publication Data
US 2017/0090961 A1 Mar. 30, 2017

(51) Int. Cl.
G06F 9/455 (2018.01)
G06F 9/50 (2006.01)

(52) U.S. Cl.
CPC ........ G06F 9/45533 (2013.01); G06F 9/5077 (2013.01); G06F 2209/5011 (2013.01); G06F 2209/5019 (2013.01)

(58) Field of Classification Search
None
See application file for complete search history.

(56) References Cited

U.S. PATENT DOCUMENTS 4,949,254 A * 8/1990 Shorter ................ G06F 9/5077
709/226
5,283,888 A 2/1994 Dao et al.
5,970,488 A 10/1999 Crowe et al.
6,708,276 B1 3/2004 Yarsa et al.
7,036,121 B1 4/2006 Casabona et al.
7,665,090 B1 2/2010 Tormasov et al.
7,707,579 B2 4/2010 Rodriguez
(Continued)

FOREIGN PATENT DOCUMENTS

EP 2663052 A1 11/2013
WO WO 2009/137567 A1 11/2009
(Continued)

OTHER PUBLICATIONS

Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].
(Continued)

Primary Examiner — Emerson Puente
Assistant Examiner — Zhi Chen
(74) Attorney, Agent, or Firm — Knobbe, Martens, Olson & Bear, LLP

(57) ABSTRACT

A system for monitoring incoming code execution requests and scheduling the corresponding code executions is provided. The system may be configured to maintain a plurality of virtual machine instances. The system may be further configured to determine whether at least some of the incoming code execution requests exhibit periodicity, and cause a reduced amount of idle compute capacity to be maintained on the virtual compute system. The system may be further configured to cause additional compute capacity to be added shortly before code execution requests are expected to be received.

21 Claims, 7 Drawing Sheets

(56) References Cited

U.S. PATENT DOCUMENTS

| | | | |
|---|---|---|---|
| 7,730,464 B2 | 6/2010 | Trowbridge | |
| 7,774,191 B2 | 8/2010 | Berkowitz et al. | |
| 7,823,186 B2 | 10/2010 | Pouliot | |
| 7,886,021 B2 | 2/2011 | Scheifler et al. | |
| 8,010,990 B2 | 8/2011 | Ferguson et al. | |
| 8,024,564 B2 | 9/2011 | Bassani et al. | |
| 8,046,765 B2 | 10/2011 | Cherkasova et al. | |
| 8,051,180 B2 | 11/2011 | Mazzaferri et al. | |
| 8,051,266 B2 * | 11/2011 | DeVal | G06F 12/0269 |
| | | | 707/813 |
| 8,065,676 B1 | 11/2011 | Sahai et al. | |
| 8,095,931 B1 | 1/2012 | Chen et al. | |
| 8,127,284 B2 | 2/2012 | Meijer et al. | |
| 8,146,073 B2 | 3/2012 | Sinha | |
| 8,166,304 B2 | 4/2012 | Murase et al. | |
| 8,171,473 B2 | 5/2012 | Lavin | |
| 8,209,695 B1 | 6/2012 | Pruyne et al. | |
| 8,336,079 B2 | 12/2012 | Budko et al. | |
| 8,429,282 B1 | 4/2013 | Ahuja | |
| 8,448,165 B1 | 5/2013 | Conover | |
| 8,613,070 B1 | 12/2013 | Borzycki et al. | |
| 8,631,130 B2 | 1/2014 | Jackson | |
| 8,677,359 B1 | 3/2014 | Cavage et al. | |
| 8,694,996 B2 | 4/2014 | Cawlfield et al. | |
| 8,719,415 B1 | 5/2014 | Sirota et al. | |
| 8,725,702 B1 | 5/2014 | Raman et al. | |
| 8,756,696 B1 | 6/2014 | Miller | |
| 8,769,519 B2 | 7/2014 | Leitman et al. | |
| 8,806,468 B2 | 8/2014 | Meijer et al. | |
| 8,819,679 B2 | 8/2014 | Agarwal et al. | |
| 8,825,964 B1 | 9/2014 | Sopka et al. | |
| 8,904,008 B2 | 12/2014 | Calder et al. | |
| 8,997,093 B2 | 3/2015 | Dimitrov | |
| 9,027,087 B2 | 5/2015 | Ishaya et al. | |
| 9,038,068 B2 | 5/2015 | Engle et al. | |
| 9,086,897 B2 | 6/2015 | Oh et al. | |
| 9,092,837 B2 | 7/2015 | Bala et al. | |
| 9,110,732 B1 | 8/2015 | Forschmiedt et al. | |
| 9,112,813 B2 | 8/2015 | Jackson | |
| 9,146,764 B1 | 9/2015 | Wagner | |
| 9,183,019 B2 | 11/2015 | Kruglick | |
| 9,208,007 B2 | 12/2015 | Harper et al. | |
| 9,223,561 B2 | 12/2015 | Orveillon et al. | |
| 9,223,966 B1 | 12/2015 | Satish et al. | |
| 9,317,689 B2 | 4/2016 | Aissi | |
| 9,323,556 B2 | 4/2016 | Wagner | |
| 9,361,145 B1 | 6/2016 | Wilson et al. | |
| 9,413,626 B2 | 8/2016 | Reque et al. | |
| 9,436,555 B2 | 9/2016 | Dornemann et al. | |
| 9,461,996 B2 | 10/2016 | Hayton et al. | |
| 9,471,775 B1 | 10/2016 | Wagner et al. | |
| 9,483,335 B1 | 11/2016 | Wagner et al. | |
| 9,489,227 B2 | 11/2016 | Oh et al. | |
| 9,537,788 B2 | 1/2017 | Reque et al. | |
| 9,588,790 B1 | 3/2017 | Wagner et al. | |
| 9,600,312 B2 | 3/2017 | Wagner et al. | |
| 9,652,306 B1 | 5/2017 | Wagner et al. | |
| 9,652,617 B1 | 5/2017 | Evans et al. | |
| 9,661,011 B1 | 5/2017 | Van Horenbeeck et al. | |
| 9,678,773 B1 | 6/2017 | Wagner et al. | |
| 9,678,778 B1 | 6/2017 | Youseff | |
| 9,715,402 B2 | 7/2017 | Wagner et al. | |
| 9,727,725 B2 | 8/2017 | Wagner et al. | |
| 9,733,967 B2 | 8/2017 | Wagner et al. | |
| 9,760,387 B2 | 9/2017 | Wagner et al. | |
| 9,785,476 B2 | 10/2017 | Wagner et al. | |
| 9,811,363 B1 | 11/2017 | Wagner | |
| 9,811,434 B1 | 11/2017 | Wagner | |
| 9,830,175 B1 | 11/2017 | Wagner | |
| 9,830,193 B1 | 11/2017 | Wagner et al. | |
| 9,830,449 B1 | 11/2017 | Wagner | |
| 2002/0172273 A1 * | 11/2002 | Baker | H04L 12/5601 |
| | | | 375/222 |
| 2003/0071842 A1 | 4/2003 | King et al. | |
| 2003/0084434 A1 | 5/2003 | Ren | |
| 2004/0249947 A1 | 12/2004 | Novaes et al. | |
| 2004/0268358 A1 | 12/2004 | Darling et al. | |
| 2005/0044301 A1 | 2/2005 | Vasilevsky et al. | |
| 2005/0132167 A1 | 6/2005 | Longobardi | |
| 2005/0132368 A1 | 6/2005 | Sexton et al. | |
| 2005/0193113 A1 | 9/2005 | Kokusho et al. | |
| 2005/0193283 A1 | 9/2005 | Reinhardt et al. | |
| 2005/0257051 A1 | 11/2005 | Richard | |
| 2006/0123066 A1 | 6/2006 | Jacobs et al. | |
| 2006/0129684 A1 * | 6/2006 | Datta | H04L 67/1008 |
| | | | 709/229 |
| 2006/0184669 A1 | 8/2006 | Vaidyanathan et al. | |
| 2006/0200668 A1 | 9/2006 | Hybre et al. | |
| 2006/0212332 A1 | 9/2006 | Jackson | |
| 2006/0242647 A1 | 10/2006 | Kimbrel et al. | |
| 2006/0248195 A1 | 11/2006 | Toumura et al. | |
| 2007/0094396 A1 | 4/2007 | Takano et al. | |
| 2007/0130341 A1 | 6/2007 | Ma | |
| 2007/0255604 A1 | 11/2007 | Seelig | |
| 2008/0028409 A1 | 1/2008 | Cherkasova et al. | |
| 2008/0082977 A1 | 4/2008 | Araujo et al. | |
| 2008/0104247 A1 | 5/2008 | Venkatakrishnan et al. | |
| 2008/0104608 A1 * | 5/2008 | Hyser | G06F 9/5027 |
| | | | 718/105 |
| 2008/0126110 A1 | 5/2008 | Haeberle et al. | |
| 2008/0126486 A1 | 5/2008 | Heist | |
| 2008/0189468 A1 | 8/2008 | Schmidt et al. | |
| 2008/0201711 A1 | 8/2008 | Amir Husain | |
| 2009/0013153 A1 | 1/2009 | Hilton | |
| 2009/0025009 A1 | 1/2009 | Brunswig et al. | |
| 2009/0055810 A1 | 2/2009 | Kondur | |
| 2009/0055829 A1 | 2/2009 | Gibson | |
| 2009/0077569 A1 | 3/2009 | Appleton et al. | |
| 2009/0125902 A1 | 5/2009 | Ghosh et al. | |
| 2009/0158275 A1 | 6/2009 | Wang et al. | |
| 2009/0193410 A1 | 7/2009 | Arthursson et al. | |
| 2009/0198769 A1 | 8/2009 | Keller et al. | |
| 2009/0204964 A1 | 8/2009 | Foley et al. | |
| 2009/0288084 A1 | 11/2009 | Astete et al. | |
| 2009/0300599 A1 | 12/2009 | Piotrowski | |
| 2010/0023940 A1 | 1/2010 | Iwamatsu et al. | |
| 2010/0031274 A1 | 2/2010 | Sim-Tang | |
| 2010/0031325 A1 | 2/2010 | Maigne et al. | |
| 2010/0036925 A1 | 2/2010 | Haffner | |
| 2010/0064299 A1 | 3/2010 | Kacin et al. | |
| 2010/0070678 A1 | 3/2010 | Zhang et al. | |
| 2010/0070725 A1 | 3/2010 | Prahlad et al. | |
| 2010/0114826 A1 | 5/2010 | Siddegowda | |
| 2010/0115098 A1 | 5/2010 | De Baer et al. | |
| 2010/0122343 A1 | 5/2010 | Ghosh | |
| 2010/0131959 A1 | 5/2010 | Spiers et al. | |
| 2010/0186011 A1 | 7/2010 | Magenheimer | |
| 2010/0198972 A1 | 8/2010 | Umbehocker | |
| 2010/0199285 A1 | 8/2010 | Medovich | |
| 2010/0257116 A1 | 10/2010 | Mehta et al. | |
| 2010/0269109 A1 | 10/2010 | Cartales | |
| 2011/0010722 A1 | 1/2011 | Matsuyama | |
| 2011/0029970 A1 | 2/2011 | Arasaratnam | |
| 2011/0055378 A1 | 3/2011 | Ferris et al. | |
| 2011/0055396 A1 | 3/2011 | DeHaan | |
| 2011/0099551 A1 | 4/2011 | Fahrig et al. | |
| 2011/0131572 A1 | 6/2011 | Elyashev et al. | |
| 2011/0134761 A1 | 6/2011 | Smith | |
| 2011/0141124 A1 | 6/2011 | Halls et al. | |
| 2011/0153727 A1 | 6/2011 | Li | |
| 2011/0153838 A1 | 6/2011 | Belkine et al. | |
| 2011/0154353 A1 * | 6/2011 | Theroux | G06F 9/5038 |
| | | | 718/104 |
| 2011/0184993 A1 | 7/2011 | Chawla et al. | |
| 2011/0265164 A1 | 10/2011 | Lucovsky | |
| 2011/0314465 A1 * | 12/2011 | Smith | G06F 9/5077 |
| | | | 718/1 |
| 2011/0321033 A1 | 12/2011 | Kelkar et al. | |
| 2012/0016721 A1 | 1/2012 | Weinman | |
| 2012/0041970 A1 | 2/2012 | Ghosh et al. | |
| 2012/0054744 A1 | 3/2012 | Singh et al. | |
| 2012/0072914 A1 | 3/2012 | Ota | |
| 2012/0096271 A1 | 4/2012 | Ramarathinam et al. | |
| 2012/0096468 A1 | 4/2012 | Chakravorty et al. | |

(56) References Cited

U.S. PATENT DOCUMENTS

| | | |
|---|---|---|
| 2012/0102307 A1 | 4/2012 | Wong |
| 2012/0102333 A1 | 4/2012 | Wong |
| 2012/0110155 A1 | 5/2012 | Adlung et al. |
| 2012/0110164 A1 | 5/2012 | Frey et al. |
| 2012/0110588 A1 | 5/2012 | Bieswanger et al. |
| 2012/0131379 A1 | 5/2012 | Tameshige et al. |
| 2012/0192184 A1 | 7/2012 | Burckart et al. |
| 2012/0197958 A1 | 8/2012 | Nightingale et al. |
| 2012/0233464 A1 | 9/2012 | Miller et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1* | 2/2013 | Jana ............... G06F 9/5038 709/226 |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0067494 A1 | 3/2013 | Srour et al. |
| 2013/0080641 A1 | 3/2013 | Lui et al. |
| 2013/0097601 A1 | 4/2013 | Podvratnik et al. |
| 2013/0111469 A1 | 5/2013 | B et al. |
| 2013/0132942 A1 | 5/2013 | Wang |
| 2013/0139152 A1 | 5/2013 | Chang et al. |
| 2013/0151648 A1 | 6/2013 | Luna |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0185729 A1 | 7/2013 | Vasic et al. |
| 2013/0191924 A1 | 7/2013 | Tedesco |
| 2013/0198319 A1* | 8/2013 | Shen ............... G06F 9/455 709/217 |
| 2013/0198743 A1 | 8/2013 | Kruglick |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227563 A1 | 8/2013 | Mcgrath |
| 2013/0227641 A1 | 8/2013 | White et al. |
| 2013/0232480 A1 | 9/2013 | Winterfeldt et al. |
| 2013/0239125 A1 | 9/2013 | Iorio |
| 2013/0263117 A1 | 10/2013 | Konik et al. |
| 2013/0275975 A1 | 10/2013 | Masuda et al. |
| 2013/0297964 A1 | 11/2013 | Hegdal et al. |
| 2013/0339950 A1 | 12/2013 | Ramarathinam et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059226 A1 | 2/2014 | Messerli et al. |
| 2014/0068611 A1 | 3/2014 | McGrath et al. |
| 2014/0082165 A1 | 3/2014 | Marr et al. |
| 2014/0101649 A1 | 4/2014 | Kamble et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault |
| 2014/0215073 A1 | 7/2014 | Dow et al. |
| 2014/0245297 A1 | 8/2014 | Hackett |
| 2014/0279581 A1 | 9/2014 | Devereaux |
| 2014/0282615 A1 | 9/2014 | Cavage et al. |
| 2014/0289286 A1 | 9/2014 | Gusak |
| 2014/0304698 A1 | 10/2014 | Chigurapati et al. |
| 2014/0304815 A1 | 10/2014 | Maeda |
| 2014/0380085 A1 | 12/2014 | Rash et al. |
| 2015/0039891 A1 | 2/2015 | Ignatchenko et al. |
| 2015/0052258 A1 | 2/2015 | Johnson et al. |
| 2015/0074659 A1 | 3/2015 | Madsen et al. |
| 2015/0081885 A1 | 3/2015 | Thomas et al. |
| 2015/0106805 A1 | 4/2015 | Melander et al. |
| 2015/0120928 A1 | 4/2015 | Gummaraju et al. |
| 2015/0135287 A1 | 5/2015 | Medeiros et al. |
| 2015/0143381 A1 | 5/2015 | Chin et al. |
| 2015/0178110 A1 | 6/2015 | Li et al. |
| 2015/0186129 A1 | 7/2015 | Apte et al. |
| 2015/0235144 A1 | 8/2015 | Gusev et al. |
| 2015/0242225 A1 | 8/2015 | Muller et al. |
| 2015/0256621 A1 | 9/2015 | Noda et al. |
| 2015/0261578 A1 | 9/2015 | Greden et al. |
| 2015/0289220 A1 | 10/2015 | Kim et al. |
| 2015/0319160 A1 | 11/2015 | Ferguson et al. |
| 2015/0332048 A1 | 11/2015 | Mooring et al. |
| 2015/0350701 A1 | 12/2015 | Lemus et al. |
| 2015/0363181 A1 | 12/2015 | Alberti et al. |
| 2015/0371244 A1 | 12/2015 | Neuse et al. |
| 2015/0378764 A1 | 12/2015 | Sivasubramanian et al. |
| 2015/0378765 A1 | 12/2015 | Singh et al. |
| 2016/0012099 A1 | 1/2016 | Tuatini et al. |
| 2016/0072727 A1 | 3/2016 | Leafe et al. |
| 2016/0092250 A1 | 3/2016 | Wagner et al. |
| 2016/0098285 A1* | 4/2016 | Davis ............... G06F 9/45545 718/1 |
| 2016/0100036 A1* | 4/2016 | Lo ............... H04L 67/42 709/203 |
| 2016/0224360 A1 | 8/2016 | Wagner et al. |
| 2016/0224785 A1 | 8/2016 | Wagner et al. |
| 2016/0239318 A1 | 8/2016 | Wagner |
| 2016/0285906 A1 | 9/2016 | Fine et al. |
| 2016/0294614 A1 | 10/2016 | Searle et al. |
| 2016/0299790 A1 | 10/2016 | Thompson |
| 2016/0301739 A1 | 10/2016 | Thompson |
| 2016/0364265 A1 | 12/2016 | Cao et al. |
| 2016/0371127 A1 | 12/2016 | Antony et al. |
| 2017/0093920 A1 | 3/2017 | Ducatel et al. |
| 2017/0116051 A1 | 4/2017 | Wagner et al. |
| 2017/0177391 A1 | 6/2017 | Wagner et al. |
| 2017/0177413 A1 | 6/2017 | Wisniewski et al. |
| 2017/0192804 A1 | 7/2017 | Wagner |
| 2017/0199766 A1 | 7/2017 | Wagner et al. |
| 2017/0206116 A1 | 7/2017 | Reque et al. |
| 2017/0286143 A1 | 10/2017 | Wagner et al. |
| 2017/0286156 A1 | 10/2017 | Wagner et al. |
| 2017/0371703 A1 | 12/2017 | Wagner et al. |
| 2017/0371706 A1 | 12/2017 | Wagner et al. |
| 2017/0371724 A1 | 12/2017 | Wagner et al. |
| 2018/0004553 A1 | 1/2018 | Wagner et al. |
| 2018/0004572 A1 | 1/2018 | Wagner et al. |

FOREIGN PATENT DOCUMENTS

| | | |
|---|---|---|
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/112526 A1 | 6/2017 |
| WO | WO 2017/172440 A1 | 10/2017 |

OTHER PUBLICATIONS

Adapter Pattern, Wikipedia, https://en.wikipedia.org/w/index.php?title=Adapter_pattern&oldid=654971255, [retrieved May 26, 2016], 6 pages.

Czajkowski, G., and L. Daynes, Multitasking Without Compromise: A Virtual Machine Evolution 47(4a):60-73, ACM SIGPLAN Notices—Supplemental Issue, Apr. 2012.

Dombrowski, M., et al., Dynamic Monitor Allocation in the Java Virtual Machine, JTRES '13, Oct. 9-11, 2013, pp. 30-37.

(56) References Cited

OTHER PUBLICATIONS

Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.
Nakajima, J., et al., Optimizing Virtual Machines Using Hybrid Virtualization, SAC '11, Mar. 21-25, 2011, TaiChung, Taiwan, pp. 573-578.
Qian, H., and D. Medhi, et al., Estimating Optimal Cost of Allocating Virtualized Resources With Dynamic Demand, ITC 2011, Sep. 2011, pp. 320-321.
Shim (computing), Wikipedia, https://en.wikipedia.org/w/index.php?title+Shim_(computing)&oldid+654971528, [retrieved on May 26, 2016], 2 pages.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
International Search Report and Written Opinion in PCT/US2015/052838 dated Dec. 18, 2015.
International Preliminary Report on Patentability in PCT/US2015/052838 dated Apr. 4, 2017.
International Search Report and Written Opinion in PCT/US2015/052833 dated Jan. 13, 2016.
International Preliminary Report on Patentability in PCT/US2015/052833 dated Apr. 4, 2017.
International Search Report and Written Opinion in PCT/US2015/064071 dated Mar. 16, 2016.
International Search Report and Written Opinion in PCT/US2016/016211 dated Apr. 13, 2016.
International Search Report and Written Opinion in PCT/US2016/026514 dated Jun. 8, 2016.
International Search Report and Written Opinion in PCT/US2016/026520 dated Jul. 5, 2016.
International Search Report and Written Opinion in PCT/US2016/054774 dated Dec. 16, 2016.
International Search Report and Written Opinion in PCT/US2016/066997 dated Mar. 20, 2017.
Amazon, "AWS Lambda: Developer Guide", Retrieved from the Internet, Jun. 26, 2016, URL : http://docs.aws.amazon.com/lambda/latest/dg/lambda-dg.pdf.
Ben-Yehuda et al., "Deconstructing Amazon EC2 Spot Instance Pricing", ACM Transactions on Economics and Computation 1.3, 2013, 15 pages.
Hoffman, Auto scaling your website with Amazon Web Services (AWS)—Part 2, Cardinalpath, Sep. 2015, 15 pages.
International Preliminary Report on Patentability in PCT/US2015/064071 dated Jun. 6, 2017.
International Preliminary Report on Patentability in PCT/US2016/016211 dated Aug. 17, 2017.
International Preliminary Report on Patentability in PCT/US2016/026514 dated Oct. 10, 2017.
International Preliminary Report on Patentability in PCT/US2016/026520 dated Oct. 10, 2017.
International Search Report and Written Opinion in PCT/US/2017/023564 dated Jun. 6, 2017.
International Search Report and Written Opinion in PCT/US2017/040054 dated Sep. 21, 2017.
International Search Report and Written Opinion in PCT/US2017/039514 dated Oct. 10, 2017.

* cited by examiner

MANAGEMENT OF PERIODIC REQUESTS FOR COMPUTE CAPACITY

The disclosure of the above-referenced application is hereby incorporated by reference in its entirety.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
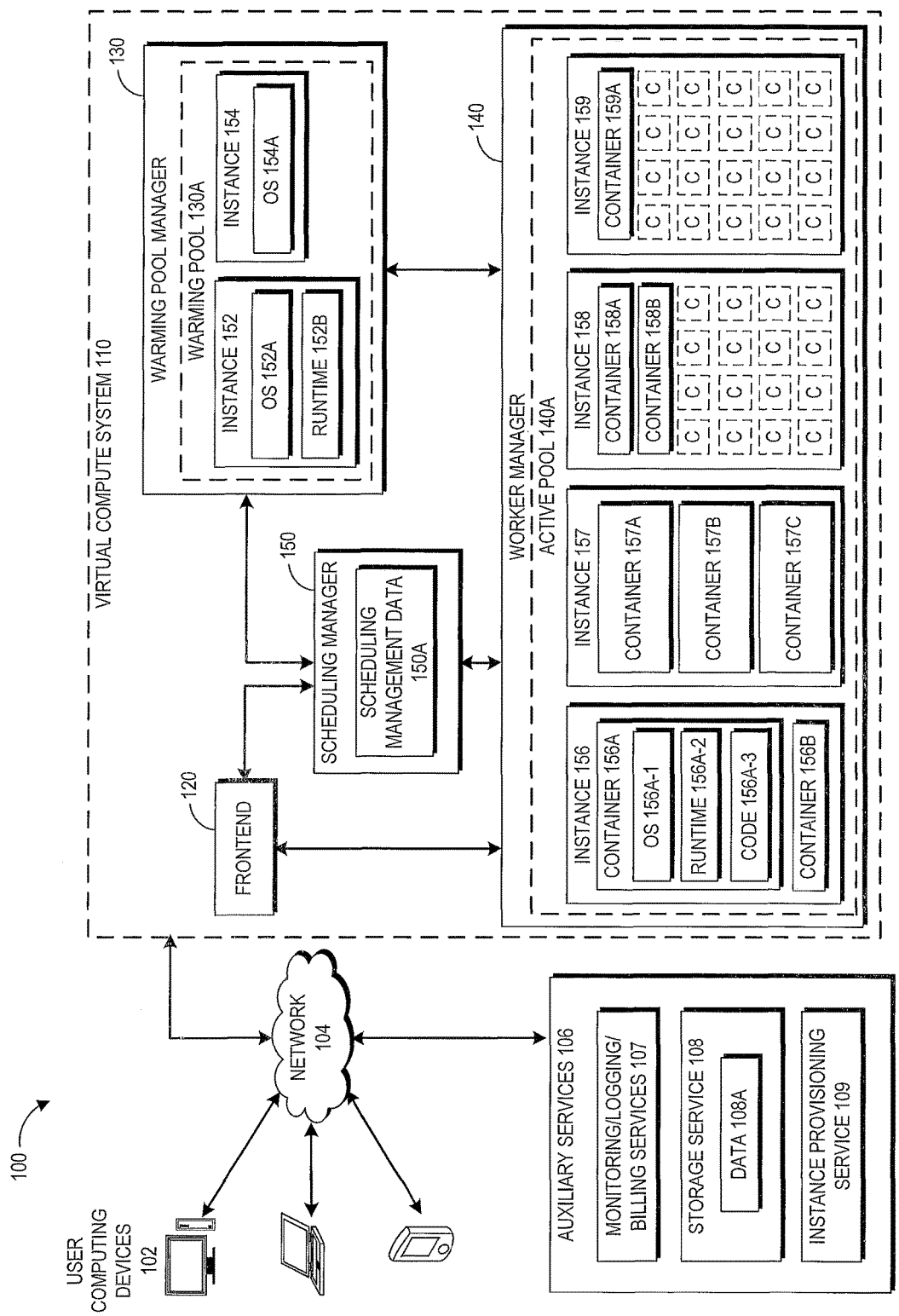
FIG. 1 is a block diagram depicting an illustrative environment for providing low latency compute capacity, according to an example aspect.

Companies and organizations no longer need to acquire and manage their own data centers in order to perform computing operations (e.g., execute code, including threads, programs, functions, software, routines, subroutines, processes, etc.). With the advent of cloud computing, storage space and compute power traditionally provided by hardware computing devices can now be obtained and configured in minutes over the Internet. Thus, developers can quickly purchase a desired amount of computing resources without having to worry about acquiring physical machines. Such computing resources are typically purchased in the form of virtual computing resources, or virtual machine instances. These instances of virtual machines are software implementations of physical machines (e.g., computers), which are hosted on physical computing devices, and may contain operating systems and applications that are traditionally provided on physical machines. These virtual machine instances are configured with a set of computing resources (e.g., memory, CPU, disk, network, etc.) that applications running on the virtual machine instances may request and can be utilized in the same manner as physical computers.

However, even when virtual computing resources are purchased, developers still have to decide how many and what type of virtual machine instances to purchase, and how long to keep them. For example, the costs of using the virtual machine instances may vary depending on the type and the number of hours they are rented. In addition, the minimum time a virtual machine may be rented is typically on the order of hours. Further, developers have to specify the hardware and software resources (e.g., type of operating systems and language runtimes, etc.) to install on the virtual machines. Other concerns that they might have include over-utilization (e.g., acquiring too little computing resources and suffering performance issues), under-utilization (e.g., acquiring more computing resources than necessary to run the codes, and thus overpaying), prediction of change in traffic (e.g., so that they know when to scale up or down), and instance and language runtime startup delay, which can take 3-10 minutes, or longer, even though users may desire computing capacity on the order of seconds or even milliseconds.

In some cases, there may be virtual compute systems that acquire and manage such virtual computing resources and provide compute capacity to users on a per-request basis. However, depending on the needs of such users, the amount and the timing of the workload received by the virtual compute systems can be unpredictable. The unpredictability may require the virtual compute systems to maintain a large amount of compute capacity (which can be expensive) that is never fully utilized just to be able to handle the worst case scenarios (e.g., a large amount of requests coming in at one time). If the virtual compute systems do not maintain enough capacity on hand to be able to handle a large number of simultaneous requests, the users may experience increased delays, increased error rates, or other performance-related issues. Thus, an improved method of reducing the amount of idle capacity that needs to be maintained is desired.

According to aspects of the present disclosure, by maintaining a pool of pre-initialized virtual machine instances that are ready for use as soon as a user request is received, and automatically managing the amount of capacity available in the pool to service incoming requests, delay (sometimes referred to as latency) associated with executing the user code (e.g., instance and language runtime startup time) can be significantly reduced, and utilization can be improved.

Generally described, aspects of the present disclosure relate to the management of virtual machine instances and containers created therein. Specifically, systems and methods are disclosed which facilitate management of virtual machine instances in a virtual compute system. The virtual compute system maintains a pool of virtual machine instances that have one or more software components (e.g., operating systems, language runtimes, libraries, etc.) loaded thereon. Maintaining the pool of virtual machine instances may involve creating a new instance, acquiring a new instance from an external instance provisioning service, destroying an instance, assigning/reassigning an instance to a user, modifying an instance (e.g., containers or resources therein), etc. The virtual machine instances in the pool can be designated to service user requests to execute program codes. In the present disclosure, the phrases "program code," "user code," and "cloud function" may sometimes be interchangeably used. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

In another aspect, a virtual compute system may monitor incoming requests to execute user code on the virtual compute system, and identify a trend in the requests (e.g., the timing of the requests, the volume of the requests, the periodicity of the requests, etc.). In view of the identified trend, the virtual compute system may anticipate certain code execution requests. Also, the virtual compute system may allow the users to specify a more flexible time frame at which they wish to run their code, such that the virtual compute system may spread out the code executions and reduce the amount of burst capacity that the virtual compute system is anticipated to be able to handle. The compute capacity maintained by the virtual compute system may include a warming pool of virtual machine instances having one or more software components loaded thereon and waiting to be used for handling an incoming request, and an active pool of virtual machine instances that are currently being used to handle one or more requests.

Knowing (or anticipating) when new code execution requests will be received, the virtual compute system can bypass the warming pool or reduce the idle capacity in the warming pool. In addition, the virtual compute system can lower the user's perceived latency by having a virtual machine instance pre-configured and ready to execute the user function when (or shortly before) the request to execute the user function is received. Further, the virtual compute system can achieve improved fleet-level management and load balancing by having knowledge of the number/size of virtual machine instances and/or containers and the duration for which they are going to be used/needed.

Specific embodiments and example applications of the present disclosure will now be described with reference to the drawings. These embodiments and example applications are intended to illustrate, and not limit, the present disclosure.

Illustrative Environment Including Virtual Compute System

With reference to FIG. 1, a block diagram illustrating an embodiment of a virtual environment 100 will be described. The example shown in FIG. 1 includes a virtual environment 100 in which users (e.g., developers, etc.) of user computing devices 102 may run various program codes using the virtual computing resources provided by a virtual compute system 110.

By way of illustration, various example user computing devices 102 are shown in communication with the virtual compute system 110, including a desktop computer, laptop, and a mobile phone. In general, the user computing devices 102 can be any computing device such as a desktop, laptop, mobile phone (or smartphone), tablet, kiosk, wireless device, and other electronic devices. In addition, the user computing devices 102 may include web services running on the same or different data centers, where, for example, different web services may programmatically communicate with each other to perform one or more techniques described herein. Further, the user computing devices 102 may include Internet of Things (IoT) devices such as Internet appliances and connected devices. The virtual compute system 110 may provide the user computing devices 102 with one or more user interfaces, command-line interfaces (CLI), application programming interfaces (API), and/or other programmatic interfaces for generating and uploading user codes, invoking the user codes (e.g., submitting a request to execute the user codes on the virtual compute system 110), scheduling event-based jobs or timed jobs, tracking the user codes, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The user computing devices 102 access the virtual compute system 110 over a network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The virtual compute system 110 is depicted in FIG. 1 as operating in a distributed computing environment including several computer systems that are interconnected using one or more computer networks. The virtual compute system 110 could also operate within a computing environment having a fewer or greater number of devices than are illustrated in FIG. 1. Thus, the depiction of the virtual compute system 110 in FIG. 1 should be taken as illustrative and not limiting to the present disclosure. For example, the virtual compute system 110 or various constituents thereof could implement various Web services components, hosted or "cloud" computing environments, and/or peer-to-peer network configurations to implement at least a portion of the processes described herein.

Further, the virtual compute system 110 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In the environment illustrated FIG. 1, the virtual environment 100 includes a virtual compute system 110, which includes a frontend 120, a warming pool manager 130, a worker manager 140, and a scheduling manager 150. In the depicted example, virtual machine instances ("instances") 152, 154 are shown in a warming pool 130A managed by the warming pool manager 130, and instances 156, 157, 158, 159 are shown in an active pool 140A managed by the worker manager 140. The illustration of the various components within the virtual compute system 110 is logical in nature and one or more of the components can be implemented by a single computing device or multiple computing devices. For example, the instances 152, 154, 156, 157, 158, 159 can be implemented on one or more physical computing devices in different various geographic regions. Similarly, each of the frontend 120, the warming pool manager 130, the worker manager 140, and the scheduling manager 150 can be implemented across multiple physical computing devices. Alternatively, one or more of the frontend 120, the warming pool manager 130, the worker manager 140, and the scheduling manager 150 can be implemented on a single physical computing device. In some embodiments, the virtual compute system 110 may comprise multiple frontends, multiple warming pool managers, multiple worker managers, and/or multiple capacity managers. Although six virtual machine instances are shown in the example of FIG. 1, the embodiments described herein are not limited as such, and one skilled in the art will appreciate that the virtual compute system 110 may comprise any number of virtual machine instances implemented using any number of physical computing devices. Similarly, although a single warming pool and a single active pool are shown in the example of FIG. 1, the embodiments described herein are not limited as such, and one skilled in the art will appreciate that the virtual compute system 110 may comprise any number of warming pools and active pools.

In the example of FIG. 1, the virtual compute system 110 is illustrated as being connected to the network 104. In some embodiments, any of the components within the virtual compute system 110 can communicate with other components (e.g., the user computing devices 102 and auxiliary services 106, which may include monitoring/logging/billing services 107, storage service 108, an instance provisioning service 109, and/or other services that may communicate with the virtual compute system 110) of the virtual environment 100 via the network 104. In other embodiments, not all components of the virtual compute system 110 are capable of communicating with other components of the virtual environment 100. In one example, only the frontend 120 may be connected to the network 104, and other components of the virtual compute system 110 may communicate with other components of the virtual environment 100 via the frontend 120.

Users may use the virtual compute system 110 to execute user code thereon. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. Alternatively, the user may send a code execution request to the virtual compute system 110. The virtual compute system 110 can handle the acquisition and configuration of compute capacity (e.g., containers, instances, etc., which are described in greater detail below) based on the code execution request, and execute the code using the compute capacity. The virtual compute system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

Frontend

The frontend 120 processes all the requests to execute user code on the virtual compute system 110. In one embodiment, the frontend 120 serves as a front door to all the other services provided by the virtual compute system 110. The frontend 120 processes the requests and makes sure that the requests are properly authorized. For example, the frontend 120 may determine whether the user associated with the request is authorized to access the user code specified in the request.

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific task, for example, in connection with a particular web application or mobile application developed by the user. For example, the user codes may be written in JavaScript (node.js), Java, Python, and/or Ruby. The request may include the user code (or the location thereof) and one or more arguments to be used for executing the user code. For example, the user may provide the user code along with the request to execute the user code. In another example, the request may identify a previously uploaded program code (e.g., using the API for uploading the code) by its name or its unique ID. In yet another example, the code may be included in the request as well as uploaded in a separate location (e.g., the storage service 108 or a storage system internal to the virtual compute system 110) prior to the request is received by the virtual compute system 110. The virtual compute system 110 may vary its code execution strategy based on where the code is available at the time the request is processed.

The frontend 120 may receive the request to execute such user codes in response to Hypertext Transfer Protocol Secure (HTTPS) requests from a user. Also, any information (e.g., headers and parameters) included in the HTTPS request may also be processed and utilized when executing the user code. As discussed above, any other protocols, including, for example, HTTP, MQTT, and CoAP, may be used to transfer the message containing the code execution request to the frontend 120. The frontend 120 may also receive the request to execute such user codes when an event is detected, such as an event that the user has registered to trigger automatic request generation. For example, the user may have registered the user code with an auxiliary service 106 and specified that whenever a particular event occurs (e.g., a new file is uploaded), the request to execute the user code is sent to the frontend 120. Alternatively, the user may have registered a timed job (e.g., execute the user code every 24 hours). In such an example, when the scheduled time arrives for the timed job, the request to execute the user code may be sent to the frontend 120. In yet another example, the frontend 120 may have a queue of incoming code execution requests, and when the user's batch job is removed from the virtual compute system's work queue, the frontend 120 may process the user request. In yet another example, the request may originate from another component within the virtual compute system 110 or other servers or services not illustrated in FIG. 1.

A user request may specify one or more third-party libraries (including native libraries) to be used along with the user code. In one embodiment, the user request is a ZIP file containing the user code and any libraries (and/or identifications of storage locations thereof). In some embodiments, the user request includes metadata that indicates the program code to be executed, the language in which the program code is written, the user associated with the request, and/or the computing resources (e.g., memory, etc.) to be reserved for executing the program code. For example, the program code may be provided with the request, previously uploaded by the user, provided by the virtual compute system 110 (e.g., standard routines), and/or provided by third parties. In some embodiments, such resource-level constraints (e.g., how much memory is to be allocated for executing a particular user code) are specified for the particular user code, and may not vary over each execution of the user code. In such cases, the virtual compute system 110 may have access to such resource-level constraints before each individual request is received, and the individual requests may not specify such resource-level constraints. In some embodiments, the user request may specify other constraints such as permission data that indicates what kind of permissions that the request has to execute the user code. Such permission data may be used by the virtual compute system 110 to access private resources (e.g., on a private network).

In some embodiments, the user request may specify the behavior that should be adopted for handling the user request. In such embodiments, the user request may include an indicator for enabling one or more execution modes in which the user code associated with the user request is to be executed. For example, the request may include a flag or a header for indicating whether the user code should be executed in a debug mode in which the debugging and/or logging output that may be generated in connection with the execution of the user code is provided back to the user (e.g., via a console user interface). In such an example, the virtual compute system 110 may inspect the request and look for the flag or the header, and if it is present, the virtual compute system 110 may modify the behavior (e.g., logging facilities) of the container in which the user code is executed, and cause the output data to be provided back to the user. In some embodiments, the behavior/mode indicators are added to the request by the user interface provided to the user by the virtual compute system 110. Other features such as source code profiling, remote debugging, etc. may also be enabled or disabled based on the indication provided in the request.

In some embodiments, the virtual compute system 110 may include multiple frontends 120. In such embodiments, a load balancer may be provided to distribute the incoming requests to the multiple frontends 120, for example, in a round-robin fashion. In some embodiments, the manner in which the load balancer distributes incoming requests to the multiple frontends 120 may be based on the state of the warming pool 130A and/or the active pool 140A. For example, if the capacity in the warming pool 130A is deemed to be sufficient, the requests may be distributed to the multiple frontends 120 based on the individual capacities of the frontends 120 (e.g., based on one or more load balancing restrictions). On the other hand, if the capacity in the warming pool 130A is less than a threshold amount, one or more of such load balancing restrictions may be removed such that the requests may be distributed to the multiple frontends 120 in a manner that reduces or minimizes the number of virtual machine instances taken from the warming pool 130A. For example, even if, according to a load balancing restriction, a request is to be routed to Frontend A, if Frontend A needs to take an instance out of the warming pool 130A to service the request but Frontend B can use one of the instances in its active pool to service the same request, the request may be routed to Frontend B.

Warming Pool Manager

The warming pool manager 130 ensures that virtual machine instances are ready to be used by the worker manager 140 when the virtual compute system 110 receives a request to execute user code on the virtual compute system 110. In the example illustrated in FIG. 1, the warming pool manager 130 manages the warming pool 130A, which is a group (sometimes referred to as a pool) of pre-initialized and pre-configured virtual machine instances that may be used to service incoming user code execution requests. In some embodiments, the warming pool manager 130 causes virtual machine instances to be booted up on one or more physical computing machines within the virtual compute system 110 and added to the warming pool 130A. In other embodiments, the warming pool manager 130 communicates with an auxiliary virtual machine instance service (e.g., the instance provisioning service 109 of FIG. 1) to create and add new instances to the warming pool 130A. In some embodiments, the warming pool manager 130 may utilize both physical computing devices within the virtual compute system 110 and one or more virtual machine instance services to acquire and maintain compute capacity that can be used to service code execution requests received by the frontend 120. In some embodiments, the virtual compute system 110 may comprise one or more logical knobs or switches for controlling (e.g., increasing or decreasing) the available capacity in the warming pool 130A. For example, a system administrator may use such a knob or switch to increase the capacity available (e.g., the number of pre-booted instances) in the warming pool 130A during peak hours. In some embodiments, virtual machine instances in the warming pool 130A can be configured based on a predetermined set of configurations independent from a specific user request to execute a user's code. The predetermined set of configurations can correspond to various types of virtual machine instances to execute user codes. The warming pool manager 130 can optimize types and numbers of virtual machine instances in the warming pool 130A based on one or more metrics related to current or previous user code executions.

As shown in FIG. 1, instances may have operating systems (OS) and/or language runtimes loaded thereon. For example, the warming pool 130A managed by the warming pool manager 130 comprises instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool manager 130 may maintain a list of instances in the warming pool 130A. The list of instances may further specify the configuration (e.g., OS, runtime, container, etc.) of the instances.

In some embodiments, the virtual machine instances in the warming pool 130A may be used to serve any user's request. In one embodiment, all the virtual machine instances in the warming pool 130A are configured in the same or substantially similar manner. In another embodiment, the virtual machine instances in the warming pool 130A may be configured differently to suit the needs of different users. For example, the virtual machine instances may have different operating systems, different language runtimes, and/or different libraries loaded thereon. In yet another embodiment, the virtual machine instances in the warming pool 130A may be configured in the same or substantially similar manner (e.g., with the same OS, language runtimes, and/or libraries), but some of those instances may have different container configurations. For example, two instances may have runtimes for both Python and Ruby, but one instance may have a container configured to run Python code, and the other instance may have a container configured to run Ruby code. In some embodiments, multiple warming pools 130A, each having identically-configured virtual machine instances, are provided.

The warming pool manager 130 may pre-configure the virtual machine instances in the warming pool 130A, such that each virtual machine instance is configured to satisfy at least one of the operating conditions that may be requested or specified by the user request to execute program code on the virtual compute system 110. In one embodiment, the operating conditions may include program languages in which the potential user codes may be written. For example, such languages may include Java, JavaScript, Python, Ruby, and the like. In some embodiments, the set of languages that the user codes may be written in may be limited to a predetermined set (e.g., set of 4 languages, although in some embodiments sets of more or less than four languages are provided) in order to facilitate pre-initialization of the virtual machine instances that can satisfy requests to execute user codes. For example, when the user is configuring a request via a user interface provided by the virtual compute system 110, the user interface may prompt the user to specify one of the predetermined operating conditions for executing the user code. In another example, the service-level agreement (SLA) for utilizing the services provided by the virtual compute system 110 may specify a set of conditions (e.g., programming languages, computing resources, etc.) that user requests should satisfy, and the virtual compute system 110 may assume that the requests satisfy the set of conditions in handling the requests. In another example, operating conditions specified in the request may include: the amount of compute power to be used for processing the request; the type of the request (e.g., HTTP vs. a triggered event); the timeout for the request (e.g., threshold time after which the request may be terminated); security policies (e.g., may control which instances in the warming pool 130A are usable by which user); scheduling information (e.g., the time by which the virtual compute system is requested to execute the program code, the time after which the virtual compute system is requested to execute the program code, the temporal window within which the virtual compute system is requested to execute the program code, etc.), etc.

Worker Manager

The worker manager 140 manages the instances used for servicing incoming code execution requests. In the example illustrated in FIG. 1, the worker manager 140 manages the active pool 140A, which is a group (sometimes referred to as a pool) of virtual machine instances that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's code in a container on a particular instance after another member's code has been executed in another container on the same instance does not pose security risks. Similarly, the worker manager 140 may assign the instances and the containers according to one or more policies that dictate which requests can be executed in which containers and which instances can be assigned to which users. An example policy may specify that instances are assigned to collections of users who share the same account (e.g., account for accessing the services provided by the virtual compute system 110). In some embodiments, the requests associated with the same user group may share the same containers (e.g., if the user codes associated therewith are identical). In some embodiments, a request does not differentiate between the different users of the group and simply indicates the group to which the users associated with the requests belong.

In the example illustrated in FIG. 1, user codes are executed in isolated compute systems referred to as containers. Containers are logical units created within a virtual machine instance using the resources available on that instance. For example, the worker manager 140 may, based on information specified in the request to execute user code, create a new container or locate an existing container in one of the instances in the active pool 140A and assigns the container to the request to handle the execution of the user code associated with the request. In one embodiment, such containers are implemented as Linux containers. The virtual machine instances in the active pool 140A may have one or more containers created thereon and have one or more program codes associated with the user loaded thereon (e.g., either in one of the containers or in a local cache of the instance).

As shown in FIG. 1, instances may have operating systems (OS), language runtimes, and containers. The containers may have individual copies of the OS and the language runtimes and user codes loaded thereon. In the example of FIG. 1, the active pool 140A managed by the worker manager 140 includes the instances 156, 157, 158, 159. The instance 156 has containers 156A, 156B. The container 156A has OS 156A-1, runtime 156A-2, and code 156A-3 loaded therein. In the depicted example, the container 156A has its own OS, runtime, and code loaded therein. In one embodiment, the OS 156A-1 (e.g., the kernel thereof), runtime 156A-2, and/or code 156A-3 are shared among the containers 156A, 156B (and any other containers not illustrated in FIG. 1). In another embodiment, the OS 156A-1 (e.g., any code running outside the kernel), runtime 156A-2, and/or code 156A-3 are independent copies that are created for the container 156A and are not shared with other containers on the instance 156. In yet another embodiment, some portions of the OS 156A-1, runtime 156A-2, and/or code 156A-3 are shared among the containers on the instance 156, and other portions thereof are independent copies that are specific to the container 156A. The instance 157 includes containers 157A, 157B, 157C. The instance 158 includes containers 158A, 158B. The instance 159 includes a container 159A.

In the example of FIG. 1, the sizes of the containers depicted in FIG. 1 may be proportional to the actual size of the containers. For example, the container 156A occupies more space than the container 156B on the instance 156. Similarly, the containers 157A, 157B, 157C may be equally sized, and the containers 158A, 158B, 159A may be equally sized. The dotted boxes labeled "C" shown in the instances 158, 159 indicate the space remaining on the instances that may be used to create new instances. In some embodiments, the sizes of the containers may be 64 MB or any multiples thereof. In other embodiments, the sizes of the containers may be any arbitrary size smaller than or equal to the size of the instances in which the containers are created. In some embodiments, the sizes of the containers may be any arbitrary size smaller than, equal to, or larger than the size of the instances in which the containers are created. By how much the sizes of the containers can exceed the size of the instance may be determined based on how likely that those containers might be utilized beyond the capacity provided by the instance.

Although the components inside the containers 156B, 157A, 157B, 157C, 158A, 158B, 159A are not illustrated in the example of FIG. 1, each of these containers may have various operating systems, language runtimes, libraries, and/or user code. In some embodiments, instances may have user codes loaded thereon (e.g., in an instance-level cache), and containers within those instances may also have user codes loaded therein. In some embodiments, the worker manager 140 may maintain a list of instances in the active pool 140A. The list of instances may further specify the configuration (e.g., OS, runtime, container, etc.) of the instances. In some embodiments, the worker manager 140 may have access to a list of instances in the warming pool 130A (e.g., including the number and type of instances). In other embodiments, the worker manager 140 requests compute capacity from the warming pool manager 130 without having knowledge of the virtual machine instances in the warming pool 130A.

After a request has been successfully processed by the frontend 120, the worker manager 140 finds capacity to service the request to execute user code on the virtual compute system 110. For example, if there exists a particular virtual machine instance in the active pool 140A that has a container with the same user code loaded therein (e.g., code 156A-3 shown in the container 156A), the worker manager 140 may assign the container to the request and cause the user code to be executed in the container. Alternatively, if the user code is available in the local cache of one of the virtual machine instances (e.g., stored on the instance 158 but does not belong to any individual containers), the worker manager 140 may create a new container on such an instance, assign the container to the request, and cause the user code to be loaded and executed in the container.

If the worker manager 140 determines that the user code associated with the request is not found on any of the instances (e.g., either in a container or the local cache of an instance) in the active pool 140A, the worker manager 140 may determine whether any of the instances in the active pool 140A is currently assigned to the user associated with the request and has compute capacity to handle the current request. If there is such an instance, the worker manager 140 may create a new container on the instance and assign the container to the request. Alternatively, the worker manager 140 may further configure an existing container on the instance assigned to the user, and assign the container to the request. For example, the worker manager 140 may determine that the existing container may be used to execute the user code if a particular library demanded by the current user request is loaded thereon. In such a case, the worker manager 140 may load the particular library and the user code onto the container and use the container to execute the user code.

If the active pool 140A does not contain any instances currently assigned to the user, the worker manager 140 pulls a new virtual machine instance from the warming pool 130A, assigns the instance to the user associated with the request, creates a new container on the instance, assigns the container to the request, and causes the user code to be downloaded and executed on the container.

In some embodiments, the virtual compute system 110 is adapted to begin execution of the user code shortly after it is received (e.g., by the frontend 120). A time period can be determined as the difference in time between initiating execution of the user code (e.g., in a container on a virtual machine instance associated with the user) and receiving a request to execute the user code (e.g., received by a frontend). The virtual compute system 110 is adapted to begin execution of the user code within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the virtual compute system 110 is adapted to begin execution of the user code within a time period that is less than a predetermined duration if one or more conditions are satisfied. For example, the one or more conditions may include any one of: (1) the user code is loaded on a container in the active pool 140A at the time the request is received; (2) the user code is stored in the code cache of an instance in the active pool 140A at the time the request is received; (3) the active pool 140A contains an instance assigned to the user associated with the request at the time the request is received; or (4) the warming pool 130A has capacity to handle the request at the time the request is received. In some embodiments, instead of initiating the requested code execution as soon as the code execution request is received, the virtual compute system 110 may schedule the code execution according to the scheduling information provided by the request. For example, the request may specify a temporal window (e.g., between 3:00 AM to 4:00 AM next Monday) within which the virtual compute system 110 is requested to perform the code execution, and the virtual compute system 110 may schedule the code execution based on certain performance considerations (e.g., workload, latency, etc.). The scheduling process is described in greater detail below with respect to FIGS. 6 and 7.

The user code may be downloaded from an auxiliary service 106 such as the storage service 108 of FIG. 1. Data 108A illustrated in FIG. 1 may comprise user codes uploaded by one or more users, metadata associated with such user codes, or any other data utilized by the virtual compute system 110 to perform one or more techniques described herein. Although only the storage service 108 is illustrated in the example of FIG. 1, the virtual environment 100 may include other levels of storage systems from which the user code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system 110) associated with the instance on which the container is created. Alternatively, the code may be downloaded from a web-based data store provided by the storage service 108.

Once the worker manager 140 locates one of the virtual machine instances in the warming pool 130A that can be used to serve the user code execution request, the warming pool manager 130 or the worker manager 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to service requests of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity. In some embodiments, the virtual compute system 110 may maintain a separate cache in which user codes are stored to serve as an intermediate level of caching system between the local cache of the virtual machine instances and a web-based network storage (e.g., accessible via the network 104).

After the user code has been executed, the worker manager 140 may tear down the container used to execute the user code to free up the resources it occupied to be used for other containers in the instance. Alternatively, the worker manager 140 may keep the container running to use it to service additional requests from the same user. For example, if another request associated with the same user code that has already been loaded in the container is received, the request can be assigned to the same container, thereby eliminating the delay associated with creating a new container and loading the user code in the container. In some embodiments, the worker manager 140 may tear down the instance in which the container used to execute the user code was created. Alternatively, the worker manager 140 may keep the instance running to use it to service additional requests from the same user. The determination of whether to keep the container and/or the instance running after the user code is done executing may be based on a threshold time, the type of the user, average request volume of the user, periodicity information (e.g., containers/instances in the active pool 140A not currently executing user code thereon can be (i) kept alive if the periodicity information indicates that additional requests are expected to arrive soon or (ii) terminated if the periodicity information indicates that additional requests are not likely to arrive soon enough to justify keeping the containers/instances alive), and/or other operating conditions. For example, after a threshold time has passed (e.g., 5 minutes, 30 minutes, 1 hour, 24 hours, 30 days, etc.) without any activity (e.g., running of the code), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the virtual compute system 110 may provide data to one or more of the auxiliary services 106 as it services incoming code execution requests. For example, the virtual compute system 110 may communicate with the monitoring/logging/billing services 107. The monitoring/logging/billing services 107 may include: a monitoring service for managing monitoring information received from the virtual compute system 110, such as statuses of containers and instances on the virtual compute system 110; a logging service for managing logging information received from the virtual compute system 110, such as activities performed by containers and instances on the virtual compute system 110; and a billing service for generating billing information associated with executing user code on the virtual compute system 110 (e.g., based on the monitoring information and/or the logging information managed by the monitoring service and the logging service). In addition to the system-level activities that may be performed by the monitoring/logging/billing services 107 (e.g., on behalf of the virtual compute system 110) as described above, the monitoring/logging/billing services 107 may provide application-level services on behalf of the user code executed on the virtual compute system 110. For example, the monitoring/logging/billing services 107 may monitor and/or log various inputs, outputs, or other data and parameters on behalf of the user code being executed on the virtual compute system 110. Although shown as a single block, the monitoring, logging, and billing services 107 may be provided as separate services.

In some embodiments, the worker manager 140 may perform health checks on the instances and containers managed by the worker manager 140 (e.g., those in the active pool 140A). For example, the health checks performed by the worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, the worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, the worker manager 140 may perform similar health checks on the instances and/or containers in the warming pool 130A. The instances and/or the containers in the warming pool 130A may be managed either together with those instances and containers in the active pool 140A or separately. In some embodiments, in the case where the health of the instances and/or the containers in the warming pool 130A is managed separately from the active pool 140A, the warming pool manager 130, instead of the worker manager 140, may perform the health checks described above on the instances and/or the containers in the warming pool 130A.

Scheduling Manager

The scheduling manager 150 monitors code execution requests received by the virtual compute system 110 (e.g., via the frontend 120) and schedules corresponding code executions. For example, the scheduling manager 150 may communicate with the frontend 120, the warming pool manager 130, and/or the worker manager 140 to schedule jobs (e.g., execution of user code on the virtual compute system 110) and/or manage the compute capacity in the warming pool 130A and/or the active pool 140A. Although the scheduling manager 150 is illustrated as a distinct component within the virtual compute system 110, part or all of the functionalities of the scheduling manager 150 may be performed by the frontend 120, the warming pool manager 130, and/or the worker manager 140. For example, the scheduling manager 150 may be implemented entirely within one of the other components of the virtual compute system 110 or in a distributed manner across the other components of the virtual compute system 110. In the example of FIG. 1, the scheduling manager 150 includes scheduling management data 150A. The scheduling management data 150A may include data regarding the history of incoming requests, capacity in the warming pool 130A, capacity in the active pool 140A, periodicity associated with particular program codes and/or user accounts, and any other metric that may be used by the scheduling manager 150 to anticipate, schedule, and re-schedule the jobs requested to be performed on the virtual compute system and accordingly adjust and/or optimize the capacity maintained and used by the virtual compute system 110. The scheduling management data 150A may also include any management policies (e.g., amount of flexibility provided to the scheduling manager 150 for scheduling jobs associated with a given user) specified by the users or determined by the scheduling manager 150 for scheduling and managing incoming requests received by the virtual compute system 110. The scheduling management data 150A may be stored in a storage device internal to the virtual compute system 110, or stored in an external storage device (e.g., storage service 108) and periodically backed up.

The scheduling manager 150 monitors code execution requests received by the virtual compute system 110 and identifies any periodicity exhibited by the incoming code execution requests. For example, the scheduling manager 150 may look for a pattern in the specific times at which code execution requests associated with the particular user account or user function are received. For example, the scheduling manager 150 may determine that the requests associated with a particular user account are received only between 3:00 AM and 3:15 AM (e.g., such requests may comprise daily maintenance operations). In another example, the scheduling manager 150 may determine that the requests associated with a particular program code are received only on Sundays (e.g., such requests may comprise weekly backup operations). In another example, the scheduling manager 150 may determine that the system-wide traffic is generally highest from 7:00 PM to 9:00 PM. In some cases, incoming code execution requests associated with certain user accounts or user functions may be received throughout the day or without exhibiting any identifiable periodicity.

In some embodiments, the scheduling manager 150 detects the periodicity using regression models of the incoming traffic patterns. In other embodiments, the scheduling manager 150 may reverse engineer the periodicity from the log data (e.g., scheduling management data 150A) generated by the scheduling manager 150 based on the parameters associated with the incoming code execution requests (e.g., time of receipt, associated user account, associated user function, maximum duration, amount of resources to be allocated, etc.). For example, the scheduling manager 150 may periodically analyze the scheduling management data 150A (e.g., daily, weekly, monthly, yearly, etc.) to identify the periodicity exhibited by the incoming code execution requests. In some embodiments, a human operator may notice the periodicity in incoming code execution requests and input certain periodicity parameters into the virtual compute system 110 (e.g., expected time of receipt, associated user account, associated user function, etc.). Based on the identified periodicity, the scheduling manager 150 may adjust the capacity maintained on the virtual compute system 110. The process of identifying the periodicity and adjusting capacity maintained on the virtual compute system 110 is described in greater detail below with reference to FIG. 5.

The scheduling manager 150 may also schedule and manage code execution on the virtual compute system 110. If a batch of code executions are requested to be performed at the same time or within a short span of time, the scheduling manager 150 may reschedule some of the code executions depending on the degree of flexibility provided by the specified timeframe for executing the user code. One way of obtaining the flexibility in the timing of execution is to build a range into the request such that any request to schedule a cloud function to be executed at a specified time actually means that the cloud function will be executed within a time period before and after the specified time. For example, if a program code is requested to be executed at 3:00 PM, the virtual compute system 110 may, by default, have the flexibility to execute the code any time between 2:50 PM and 3:10 PM. The users of the virtual compute system 110 may be notified of this range. The range may vary depending on the implementation.

In some embodiments, the cost associated with executing user functions on the virtual compute system 110 may vary depending on the degree of temporal flexibility specified by the request. For example, if the user requested that a program code be run between 11:00 PM and 1:00 AM, the cost might be 0.01 cents per execution. If the user requested that the program code be run between 11:55 PM and 1:05 AM, the cost might be 0.02 cents per execution. If the user requested that the program code be run exactly at 12:00 AM, the cost might be 0.05 cents per execution. Another example that provides the virtual compute system 110 a lot of flexibility is to allow the users to specify that the user functions can be run whenever the traffic is low, as determined by the request arrival rates, the number of concurrent jobs being processed, or other mechanisms (which may be less expensive than specifying a window).

The compute system 110 may present to the user (e.g., via a graphical user interface that allows the user the schedule code executions) the costs associated with the various ranges that can be specified for the code execution requests. The flexibility in the start times provides the virtual compute system 110 the ability to schedule the code executions when the incoming traffic is low, thereby reducing the amount of burst capacity that the virtual compute system 110 needs to provide.

In some embodiments, rather than using a range to obtain flexibility, the user may specify a point in time before or after which the virtual compute system 110 is requested to run the program. For example, the request may specify that the virtual compute system 110 should run a program code sometime after October 10th (e.g., on the specified date or later). In another example, the request may specify that the virtual compute system 110 should finish running a program code sometime before October 8th (e.g., finish executing the program code on or before October 8th). In such an example, the virtual compute system 110 may ensure that the code execution is initiated at least an amount of time equal to the maximum duration before the specified deadline. In yet another example, the request may specify that the virtual compute system 110 should start running a program code sometime before October 8th (e.g., initiate execution of the program code on or before October 8th, but need not finish on or before October 8th). In some embodiments, each code execution request specifies a maximum duration after which the execution of the program code should be considered to have timed out. In such embodiments, the virtual compute system 110 may utilize the specified maximum duration to spread out the workload so that the virtual compute system 110 is not overloaded at any given point in time. The process of scheduling code executions in a flexible manner is described in greater detail below with reference to FIG. 6.

The scheduling manager 150 may include a request and capacity monitoring unit for monitoring the requests received by the virtual compute system 110, and a schedule and capacity adjustment unit for scheduling and managing code execution and capacity on the virtual compute system 110. An example configuration of the scheduling manager 150 is described in greater detail below with reference to FIG. 4.

Illustrative Example of Processing Periodic Jobs

Figure 2:
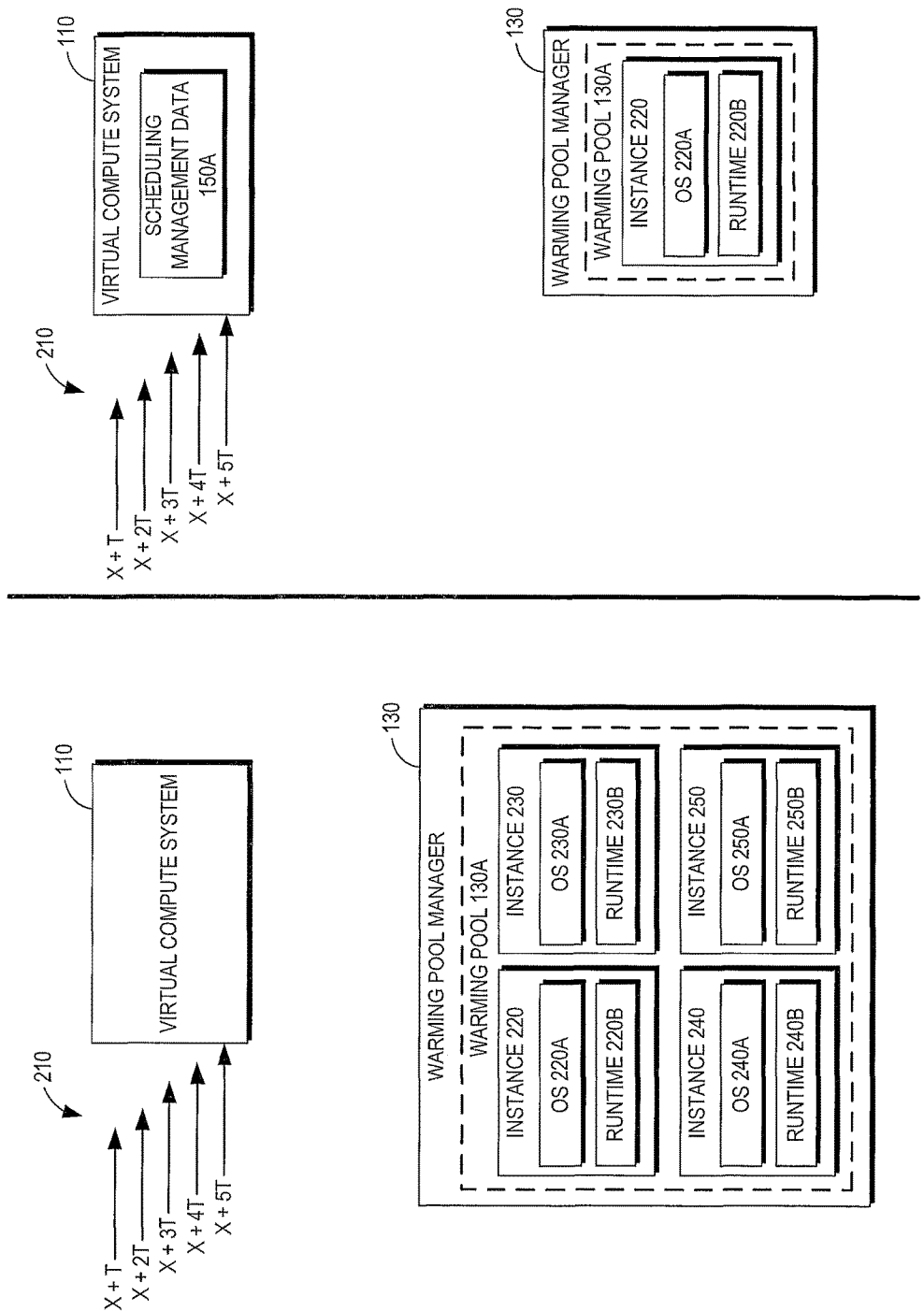
FIG. 2 is a block diagram depicting an illustrative configuration of a warming pool, according to an example aspect.

With reference to FIG. 2, the warming pool manager 130 in the virtual compute system 110 with (right) and without (left) the scheduling manager 150 will be described. In the example of FIG. 2, periodic requests 210 are received by the virtual compute system 110.

The example on the left side of FIG. 2 illustrates a system that may not recognize the periodicity of the periodic requests 210. In the example of FIG. 2, the five arrows of the periodic requests 210 may each represent a code execution request received at the specified time (e.g., X+T, X+2T, X+3T, X+4T, and X+5T, where T is the period). In this example, the virtual compute system 110 includes a warming pool 130A that includes virtual machine instances 220, 230, 240, and 250 (each having appropriate OS and runtime loaded thereon). Without having knowledge of when code execution requests will be received, the virtual compute system 110 may need to maintain a large amount of compute capacity in its warming pool 130A to accommodate any burst traffic by, for example, accounting for running all of these jobs in parallel.

The example on the right side of FIG. 2 illustrates a system that has identified the periodicity of the periodic requests 210. In this example, the virtual compute system 110 includes a warming pool 130A that includes virtual machine instance 220 (with OS 220A and runtime 220B loaded thereon). Knowing when the periodic requests 210 will be received, the virtual compute system 110 can maintain a reduced amount of capacity in its warming pool 130A, and can acquire the compute capacity needed to process the periodic requests 210 shortly before they are received. For example, knowing that the 5 jobs are periodic and thus do not overlap could decrease the amount of excess capacity by 80% (compared with maintaining capacity enough to perform the 5 jobs in parallel). In another example, if the virtual compute system 110 receives 10 requests per day on average, knowing the periodicity of 5 of them (e.g., these requests are respectively received at 1:00 PM, 2:00 PM, 3:00 PM, 4:00 PM, and 5:00 PM daily) may allow the virtual compute system 110 to ignore these requests (because knowing when they will arrive, capacity may be added just before their anticipated time of arrival) for the purpose of determining how much capacity to maintain in the warming pool 130A, which would reduce the warming pool capacity by half. Thus, by identifying and keeping track of the periodicity in the incoming code execution requests, the virtual compute system 110 can realize the cost savings associated with the reduction in the number of virtual machine instances it has to maintain in its warming pool 130A.

Illustrative Example of Scheduling Jobs

Figure 3:
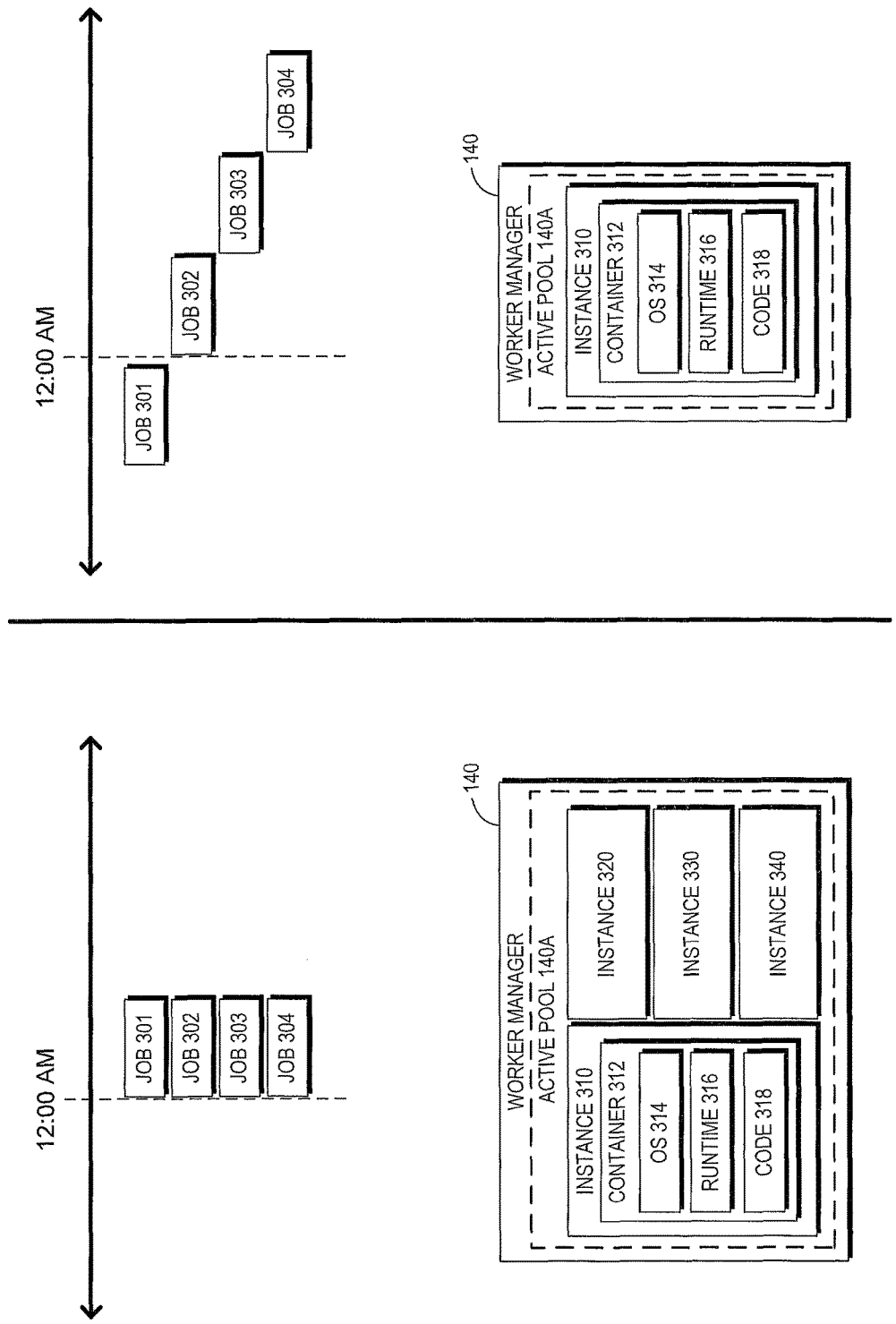
FIG. 3 is a block diagram depicting an illustrative configuration of an active pool, according to an example aspect.

With reference to FIG. 3, the worker manager 140 in the virtual compute system 110 before (left) and after (right) the scheduling manager 150 has scheduled (or re-scheduled) scheduled jobs will be described. In the example of FIG. 3, jobs 301-304 are requested by users of the virtual compute system 110 and scheduled by, for example, the scheduling manager 150 of the virtual compute system 110.

The example on the left side of FIG. 3 illustrates all of the jobs 301-304 being scheduled to begin at 12:00 AM. In order to run all of the jobs 301-304, the active pool 140A may need to be running 4 virtual machine instances (e.g., instances 310, 320, 330, and 340, each loaded with the appropriate OS, runtime, and code) or containers. Without having the flexibility in scheduling the jobs 301-304, the virtual compute system 110 may need to be running a large amount of virtual machine instances simultaneously, and as a result, may experience increased latency and/or any other issues.

The example on the right side of FIG. 3 illustrates a system in which the scheduling manager 150 has spread out the scheduled jobs 301-304 such that only a single job is being performed at any given time. By having the flexibility in scheduling the jobs and spreading out the workload based on the flexibility, the virtual compute system 110 may be able to operate using a fewer number of virtual machine instances and prevent itself from being overburdened by having to process a large amount of simultaneous jobs or to save cost.

General Architecture of Scheduling Manager

Figure 4:
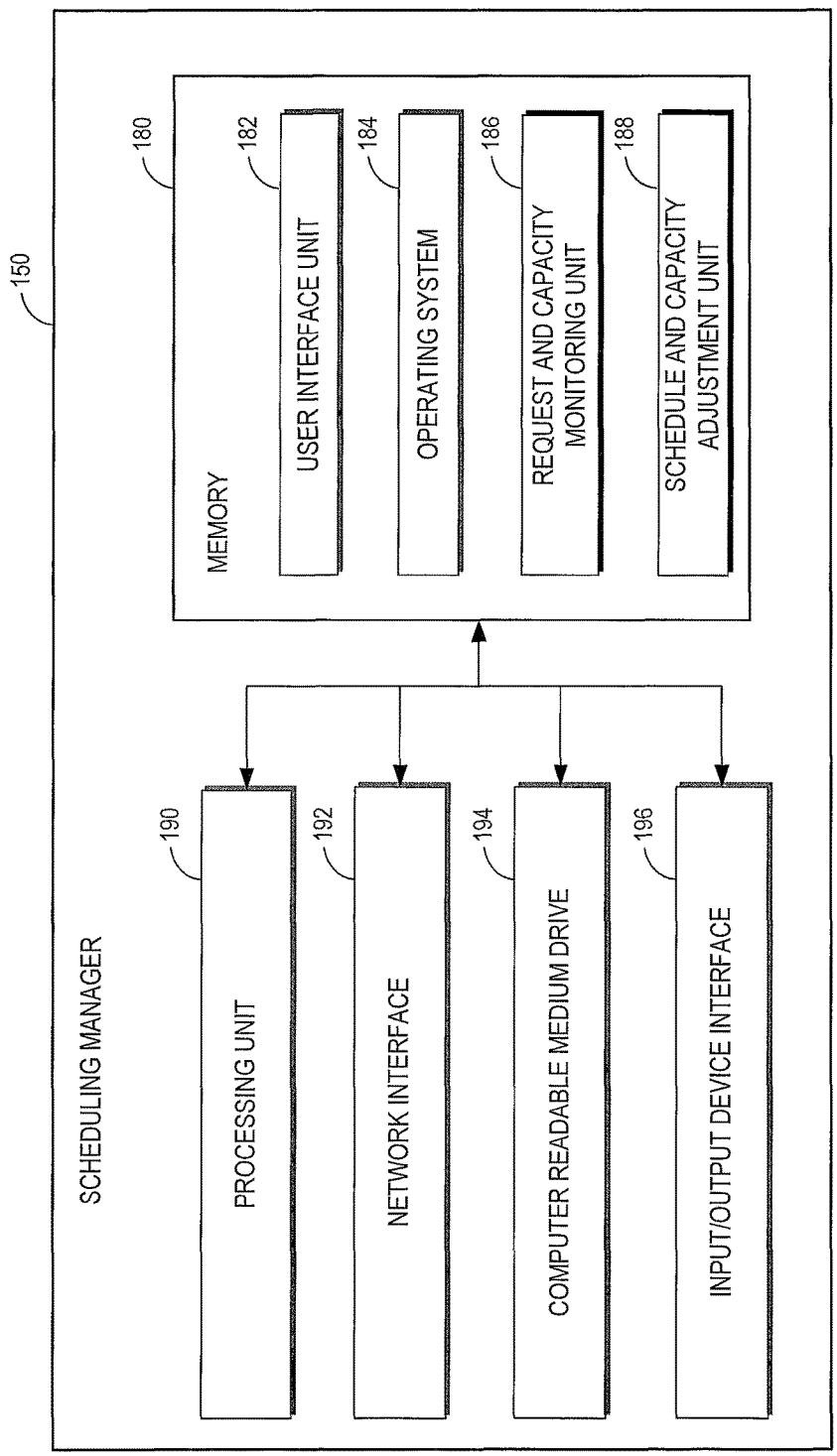
FIG. 4 depicts a general architecture of a computing device providing a scheduling manager for monitoring and scheduling code execution requests, according to an example aspect.

FIG. 4 depicts a general architecture of a computing system (referenced as scheduling manager 150) that manages the virtual machine instances in the virtual compute system 110. The general architecture of the scheduling manager 150 depicted in FIG. 4 includes an arrangement of computer hardware and software modules that may be used to implement aspects of the present disclosure. The scheduling manager 150 may include many more (or fewer) elements than those shown in FIG. 4. It is not necessary, however, that all of these generally conventional elements be shown in order to provide an enabling disclosure. As illustrated, the scheduling manager 150 includes a processing unit 190, a network interface 192, a computer readable medium drive 194, an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer-readable media. The memory 180 may store an operating system 184 that provides computer program instructions for use by the processing unit 190 in the general administration and operation of the scheduling manager 150. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include a request and capacity monitoring unit 186 and a schedule and capacity adjustment unit 188 that may be executed by the processing unit 190. In one embodiment, the user interface unit 182, request and capacity monitoring unit 186, and schedule and capacity adjustment unit 188 individually or collectively implement various aspects of the present disclosure, e.g., monitoring incoming code execution requests, determining whether the incoming code execution requests exhibit any periodicity, causing a reduced amount of idle capacity to be maintained in the warming pool 130A, acquiring compute capacity for handling incoming code execution requests just before such incoming code execution requests are received (e.g., based on their periodicity), scheduling multiple jobs such that they do not overlap with each other, etc. as described further below.

The request and capacity monitoring unit 186 monitors incoming code execution requests. For example, the request and capacity monitoring unit 186 monitors incoming code execution requests and identifies any periodicity exhibited by some or all of the incoming code execution requests that may be used to better manage the capacity on the virtual compute system 110 (e.g., reduce the number of capacity maintained in the warming pool 130A). The request and capacity monitoring unit 186 may keep track of the time at which each of the incoming code execution requests are received and the user accounts and/or the user functions associated with such requests along with requested and actual duration or other resource consumption, such as memory.

The schedule and capacity adjustment unit 188 schedules jobs and adjusts capacity in the warming pool 130A and/or the active pool 140A. for example, based on the periodicity identified by the request and capacity monitoring unit 186, the schedule and capacity adjustment unit 188 may cause the amount of capacity maintained in the warming pool 130A to be reduced. Further, the scheduling capacity adjustment unit 188 may cause additional capacity to be added to the active pool 140A shortly before the time at which the code execution requests identified as being periodic are expected to be received by the virtual compute system 110 or cause capacity in the active pool 140A to be retained longer than usual in order to service an anticipated future request based on periodicity analysis/predictions.

While the request and capacity monitoring unit 186 and the schedule and capacity adjustment unit 188 are shown in FIG. 4 as part of the scheduling manager 150, in other embodiments, all or a portion of the request and capacity monitoring unit 186 and the schedule and capacity adjustment unit 188 may be implemented by other components of the virtual compute system 110 and/or another computing device. For example, in certain embodiments of the present disclosure, another computing device in communication with the virtual compute system 110 may include several modules or components that operate similarly to the modules and components illustrated as part of the scheduling manager 150.

Example Routine for Managing Schedule Code Execution Requests

Figure 5:
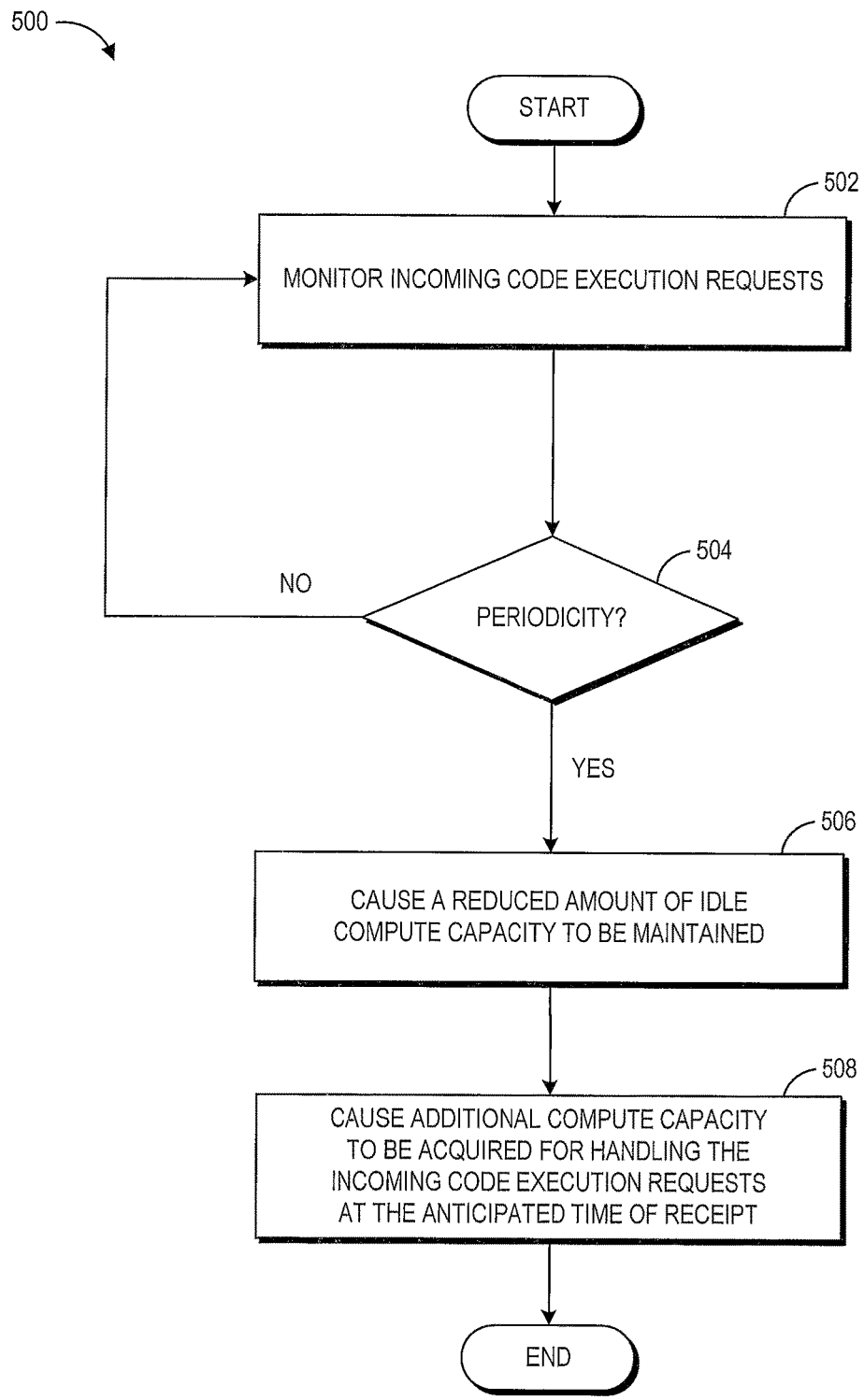
FIG. 5 is a flow diagram illustrating a periodic job management routine implemented by a scheduling manager, according to an example aspect.

Turning now to FIG. 5, a routine 500 implemented by one or more components of the virtual compute system 110 (e.g., the scheduling manager 150) will be described. Although routine 500 is described with regard to implementation by the scheduling manager 150, one skilled in the relevant art will appreciate that alternative components may implement routine 500 or that one or more of the blocks may be implemented by a different component or in a distributed manner.

At block 502 of the illustrative routine 500, the scheduling manager 150 monitors incoming code execution requests that are received by the virtual compute system 110, for example, to identify any periodicity exhibited by the incoming requests (e.g., any indication that at least some of the incoming requests are periodic in nature). The scheduling manager 150 may record the time at which each request is received by the virtual compute system 110 in a database (e.g., scheduling management data 150A) along with the identity of the program code associated with the request, the user account associated with the request, the maximum duration associated with the request, and/or any other parameters associated with the request, along with actual resource consumption, including running tie (duration), memory usage, throttles applied, security tests passed or failed, etc.

Next, at block 504, the scheduling manager 150 determines whether any periodicity is exhibited by at least some of the incoming code execution requests received by the virtual compute system 110. For example, the scheduling manager 150 may determine that the requests associated with a particular user account are received only between 3:00 AM and 3:15 AM (e.g., such requests may comprise daily maintenance operations). In another example, the scheduling manager 150 may determine that the requests associated with a particular program code are received only on Sundays (e.g., such requests may comprise weekly backup operations). In another example, the scheduling manager 150 may determine that the system-wide traffic is generally highest from 7:00 PM to 9:00 PM. In some cases, incoming code execution requests associated with certain user accounts or user functions may be received throughout the day or without exhibiting any identifiable periodicity. Even in such cases, by identifying at least some code execution requests that exhibit identifiable periodicity, the virtual compute system 110 may be able to treat such code execution requests as scheduled requests. Such periodic or scheduled requests result in cost savings for the virtual compute system 110 because if the virtual compute system 110 when the requests will be received, the virtual compute system 110 need not maintain idle compute capacity (which may be costly) just to be able to handle unpredictable burst traffic; it can simply acquire compute capacity when (or just before) the requests arrive at the virtual compute system 110. In some embodiments, the scheduling manager 150 may process the logs and/or metrics generated by the virtual compute system 110 based on the incoming code execution requests to determine whether any periodicity is exhibited by any of such code execution requests.

If the scheduling manager 150 determines that at least some of the code execution requests received by the virtual compute system 110 exhibit a degree of periodicity, the routine 500 proceeds to block 506, where the scheduling manager 150 causes a reduced amount of idle compute capacity (or unallocated compute capacity that is not assigned to a particular user account or is between jobs) to be maintained (e.g., in the warming pool 130A). For example, the reduced amount may be proportional to the number of code execution requests identified as being periodic. If none of the code execution requests is identified as being periodic, the idle compute capacity maintained in the warming pool 130A may not be reduced at all. On the other hand, if all of the code execution requests are identified as being periodic, all the idle compute capacity maintained in the warming pool 130A may be removed. Similarly, if half of the code execution requests are identified as being periodic, the amount of idle compute capacity maintained in the warming pool 130A may be reduced to half of the amount normally maintained in the warming pool 130A. If the scheduling manager 150 determines that none of the code execution requests exhibits any periodicity, the routine 500 proceeds to block 502, and the scheduling manager 150 continues to monitor incoming code execution requests. In some embodiments, the scheduling manager 150 (or other components of the virtual compute system 110 such as the warming pool manager 130) causes a reduced amount of idle compute capacity to be maintained by refraining from adding additional virtual machine instances to the warming pool 130A until the number of virtual machine instances in the warming pool 130A reaches a number corresponding to the reduced amount. For example, if the scheduling manager 150 determines that the idle capacity maintained in the warming pool 130A should be reduced by half based on the periodicity exhibited by the incoming code execution requests, the scheduling manager 150 may refrain from adding additional capacity to the warming pool 130A until the amount of capacity in the warming pool 130A becomes half the amount that was previously being maintained in the warming pool 130A. In some cases, the scheduling manager 150 may actively shut down some of the virtual machine instances in the warming pool 130A to reach a reduced number. In other cases, the scheduling manager 150 may cause instances to be moved more freely (or aggressively) from the warming pool 130A to the active pool 140A. In some embodiments, the reduction in the amount of idle compute capacity may result from the active pool 140A. For example, virtual machine instances placed in the active pool 140A but not currently executing user code thereon that would otherwise be kept alive (e.g., without the periodicity information) in an idle state in the active pool 140A may be spun down, based on the periodicity detected at block 504 (e.g., a determination that no request that would use the currently idle instance in the active pool 140A is expected to arrive anytime soon).

At block 508, the scheduling manager 150 causes additional compute capacity to be acquired for handling the incoming code execution requests (or the next request that exhibits the same periodicity as the incoming code execution requests determined to exhibit some degree of periodicity), which are identified as being periodic, at the anticipated time of receipt. For example, if, based on the identified periodicity, the virtual compute system 110 is expected to receive a batch of code execution requests at 3:00 PM, the scheduling manager 150 may cause additional compute capacity (e.g., one or more virtual machine instances) sufficient to handle the batch of code execution requests to be acquired (e.g., by sending a request to the instance provisioning service 109 or by instructing another component of the virtual compute system 110 to do so) sometime before the time the batch of requests are expected to arrive (e.g., 2:59 PM, or at a time that would allow the virtual compute system 110 to configure the compute capacity to handle the batch of requests by 3:00 PM). For example, the threshold amount of time before which the additional compute capacity is acquired and pre-initialized may vary based on the program code, the user account, or the request. In some cases, the acquired compute capacity may be added directly to the active pool 140A. For example, if the batch of code execution requests are associated with a user whose execution settings are known, the acquired compute capacity may be pre-initialized and placed in the active pool 140 so that the compute capacity can be used as soon as the requests arrive. In some embodiments, additional compute capacity may be added by keeping alive one or more virtual machine instances placed in the active pool 140A but not currently executing user code thereon that would otherwise be terminated (e.g., without the periodicity information) in an idle state in the active pool 140A in anticipation of the code execution requests identified as being periodic. In other cases, the acquired compute capacity may be added to the warming pool 130A. For example, if the scheduling manager 150 determines that a system-wide increase in incoming code execution requests is expected in 10 minutes, the scheduling manager 150 may acquire additional capacity and add such capacity to the warming pool 130A so the added capacity may be used to handle a more diverse group of requests. In some embodiments, the scheduling manager 150 (or other components of the virtual compute system 110 such as the worker manager 140) may create one or more containers on the virtual machine instance(s) acquired for executing user functions associated with the batch of requests, and load the user functions onto the container(s) before the batch of requests are received by the virtual compute system 110. By doing so, the scheduling manager 150 allows the user functions to be executed as soon as the batch of requests are received, without having to first acquire virtual machine instances, create one or more containers thereon, and load one or more user functions onto the containers, thereby reducing the delay associated with executing the user functions on the virtual compute system 110.

While the routine 500 of FIG. 5 has been described above with reference to blocks 502-508, the embodiments described herein are not limited as such, and one or more blocks may be omitted, modified, or switched without departing from the spirit of the present disclosure.

Example Routine for Scheduling Code Execution Requests Based on Temporal Criteria Turning now to FIG. 6, a routine 600 implemented by one or more components of the virtual compute system 110 (e.g., the scheduling manager 150) will be described. Although routine 600 is described with regard to implementation by the scheduling manager 150, one skilled in the relevant art will appreciate that alternative components may implement routine 600 or that one or more of the blocks may be implemented by a different component or in a distributed manner.

At block 602 of the illustrative routine 600, the scheduling manager 150 receives a first job request having a first time frame for executing a first program code. For example, the first job request may request that a backup routine be executed at 3:00 AM tomorrow. In some embodiments, the time frame specified by the request may be one of (i) a time by which the virtual compute system is requested to execute the first program code (e.g., "execute the backup routine by 3:00 AM but you can get started any time before that"), (ii) a time after which the virtual compute system is requested to execute the first program code (e.g., "execute the backup routine after 3:00 AM but you can take however much time before you initiate the backup routine"), or (iii) a temporal window within which the virtual compute system is requested to execute the first program code (e.g., "execute the backup routine between 2:30 AM and 3:30 AM" or "execute the backup routine at 3:00 AM plus or minus 30 minutes"). In some embodiments, the time frame may be provided in the request itself. In other embodiments, the scheduling manager 150 may determine the time frame associated with a request by looking up the time frame using the user account associated with the request or the program code associated with the request, or by using system-wide settings or published system-wide, per-account, or per-function SLAs. In some embodiments, the scheduling manager 150 is configured to provide, via a user interface, an option of selecting among various degrees of temporal flexibility (e.g., options (i)-(iii) listed above). In some embodiments, the varying degrees of temporal flexibility may be associated with varying amounts of cost associated with executing user functions on the virtual compute system 110. For example, it may cost the user 0.01 cents per execution if the user specifies a 2-hour range within which a requested user function is to be executed, but cause the user 0.1 cents per execution if the user specifies an exact point in time at which the requested user function is to be executed.

At block 604, the scheduling manager 150 receives a second job request having a second time frame for executing a second program code. For example the second job request may request that a file compression routine be executed at 3:00 AM tomorrow. As discussed above, the time frame specified by the request may be one of (i) a time by which the virtual compute system is requested to execute the second program code (e.g., "execute the file compression routine by 3:00 AM but you can get started any time before that"), (ii) a time after which the virtual compute system is requested to execute the second program code (e.g., "execute the file compression routine after 3:00 AM but you can take however much time before you initiate the file compression"), or (iii) a temporal window within which the virtual compute system is requested to execute the second program code (e.g., "execute the file compression routine between 2:30 AM and 3:30 AM" or "execute the file compression routine at 3:00 AM plus or minus 30 minutes"). Although the backup routine and the file compression routine are used herein as examples, any other program code, user function, etc. may be used. In some embodiments, the requests also specify a maximum duration after which the corresponding code execution should be considered to have timed out. For example, such a maximum duration may provide the scheduling manager 150 the assurance that a user function will not still be running after a period of time equal to the maximum duration has passed since the time at which the execution of the user function was initiated.

At block 606, the scheduling manager 150 schedules the first and second jobs such that the first and second jobs do not overlap with each other. In the example above, even though the specified time frame for each of the first and second job requests may refer to 3:00 AM, there may be some flexibility in scheduling the jobs. If both of the job requests specify that the corresponding routines should be executed at 3:00 AM or sometime after that, the scheduling manager 150 may schedule the backup routine to be executed at 3:00 AM and the file compression routine to be executed at 3:10 AM. If both of the job requests specify that the corresponding routines should finish executing by 3:00 AM or sometime before that, the scheduling manager 150 may schedule the backup routine to be executed at 2:40 AM and the file compression routine to be executed at 2:50 AM. If both of the job requests specify that the corresponding routines should be executed between 2:30 AM and 3:30 AM, the scheduling manager 150 may schedule the backup routine to be executed at 2:50 AM and the file compression routine to be executed at 3:00 AM. In some embodiments, if both of the job requests specify that the corresponding routines must finish executing before 3:00 AM, neither job can be scheduled after (3:00 AM-(max duration of the respective job)).

Figure 6:
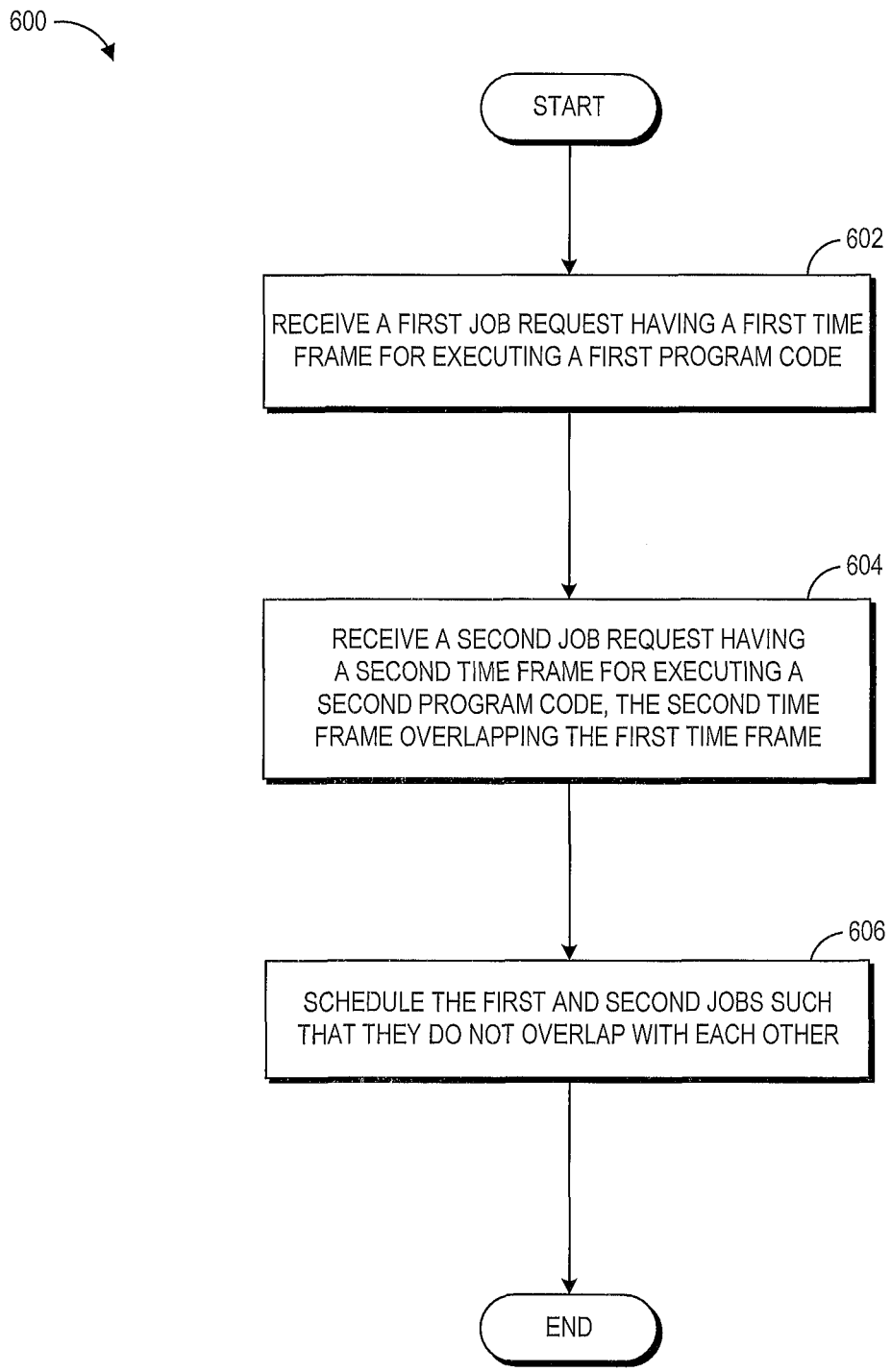
FIG. 6 is a flow diagram illustrating a job scheduling routine implemented by a scheduling manager, according to an example aspect.

While the routine 600 of FIG. 6 has been described above with reference to blocks 602-606, the embodiments described herein are not limited as such, and one or more blocks may be omitted, modified, or switched without departing from the spirit of the present disclosure.

Example Routine for Scheduling Jobs Based on Execution Requirements

Figure 7:
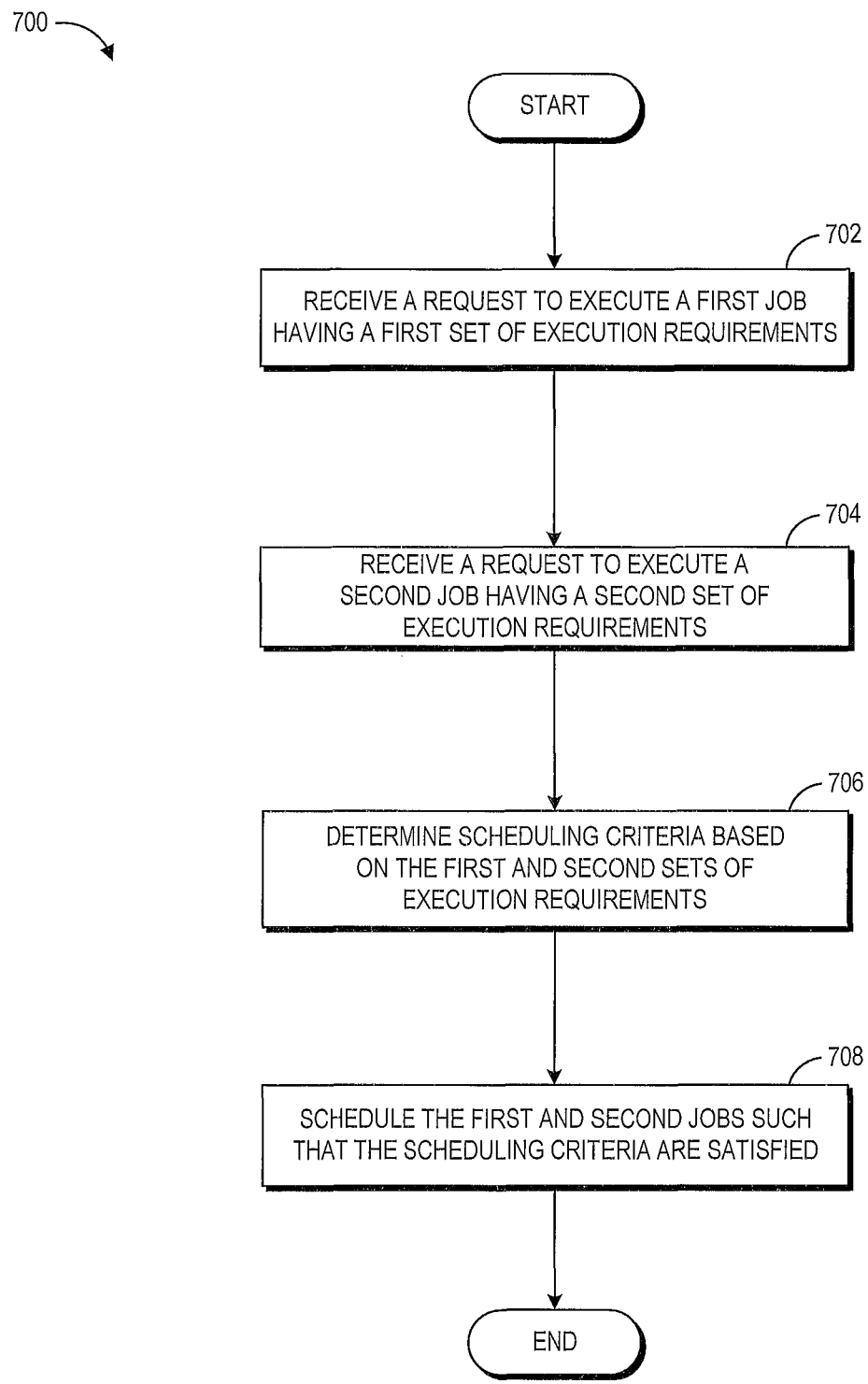
FIG. 7 is a flow diagram illustrating another job scheduling routine implemented by a scheduling manager, according to an example aspect.

Turning now to FIG. 7, a routine 700 implemented by one or more components of the virtual compute system 110 (e.g., the scheduling manager 150) will be described. Although routine 700 is described with regard to implementation by the scheduling manager 150, one skilled in the relevant art will appreciate that alternative components may implement routine 700 or that one or more of the blocks may be implemented by a different component or in a distributed manner.

At block 702 of the illustrative routine 700, the scheduling manager 150 receives a request to execute a first job having a first set of execution requirements. For example, the first set of execution requirements may include the amount of computing resources (e.g., memory, CPU, network, etc.) used to execute the first job. In another example, the first set of execution requirements may include temporal or spatial resource such as how much time is needed to execute the first job, and how much compute capacity is needed to execute the first job, etc. For example, the first job may be a file compression routine that uses 128 MB of memory.

At block 704, the scheduling manager 150 the scheduling manager 150 receives a request to execute a second job having a second set of execution requirements. For example, the second set of execution requirements may include the amount of computing resources (e.g., memory, CPU, network, etc.) used to execute the second job. In another example, the second set of execution requirements may include temporal or spatial resource such as how much time is needed to execute the second job, and how much compute capacity is needed to execute the second job, etc. For example, the second job may be an image processing routine that uses 512 MB of memory.

At block 706, the scheduling manager 150 determines one or more scheduling criteria based on the first and second sets of execution requirements. For example, the scheduling manager 150, having determined that the first job uses 128 MB of memory and the second job uses 512 MB of memory, may further determine that for the first and second jobs to be executed simultaneously (or executed such that the jobs temporally overlap), at least 640 MB of memory is needed. In other words, the scheduling criteria may be that (i) the first job can be scheduled to be executed as long as the virtual compute system 110 has at least 128 MB of free memory, (ii) the second job can be scheduled to be executed as long as the virtual compute system 110 has at least 512 MB of free memory, and (iii) the first and second jobs can be scheduled to be executed in a temporally overlapping manner as long as the virtual compute system 110 has at least 640 MB of free memory.

At block 708, the scheduling manager 150 schedules the first and second jobs such that the scheduling criteria are satisfied. In the example discussed above, the scheduling manager 150 may schedule the first and second jobs to be executed simultaneously if the virtual compute system has 1 GB of memory at the time the first and second jobs are to be executed. If the virtual compute system 110 has only 600 MB of memory available, the scheduling manager 150 may schedule the first and second jobs such that the executions do not overlap. Although memory is used to illustrate the resource contention between the first and second jobs, the techniques can be extended to any other resources that may be utilized by both the first and second jobs.

While the routine 700 of FIG. 7 has been described above with reference to blocks 702-708, the embodiments described herein are not limited as such, and one or more blocks may be omitted, modified, or switched without departing from the spirit of the present disclosure.

Other Considerations

It will be appreciated by those skilled in the art and others that all of the functions described in this disclosure may be embodied in software executed by one or more physical processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storage medium storing the computer executable components such as a CD-ROM, DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for providing low-latency computational capacity from a virtual compute fleet, the system comprising:

an electronic data store configured to store at least a program code of a user; and a virtual compute system comprising one or more hardware computing devices executing specific computer-executable instructions, said virtual compute system in communication with the data store, and configured to at least:

maintain a plurality of virtual machine instances on one or more physical computing devices, wherein the plurality of virtual machine instances comprise:

a warming pool comprising virtual machine instances having one or more software components loaded thereon; and an active pool comprising virtual machine instances assigned to one or more accounts;

monitor incoming code execution requests to execute program codes on the virtual compute system, at least some of the incoming code execution requests exhibiting a degree of periodicity;

determine the degree of periodicity associated with the at least some of the incoming code execution requests, the determined degree of periodicity indicating a time period at which a subsequent code execution request associated with the at least some of the incoming code execution requests is expected to be received by the virtual compute system;

in response to determining the degree of periodicity associated with the at least some of the incoming code execution requests, cause a reduced number of virtual machine instances to be maintained by the virtual compute system, wherein the reduced number is determined based on a number of the at least some of the incoming code execution requests and the determined degree of periodicity;

cause at least one virtual machine instance to be added to the active pool before the time period at which the subsequent code execution request is expected to be received;

cause a program code associated with the at least some of the incoming code execution requests to be loaded on the at least one virtual machine instance subsequent to causing the reduced number of virtual machine instances to be maintained and before the time period at which the subsequent code execution request is expected to be received; and in response to receiving the subsequent code execution request associated with the at least some of the incoming code execution requests, cause the program code loaded on the at least one virtual machine to be executed.

2. The system of claim 1, wherein the virtual compute system is further configured to:
receive a first request to execute a first program code at a first time period;
receive a second request to execute a second program code at a second time period, wherein the second time period at least partially overlaps the first time period; and
schedule a first execution of the first program code and a second execution of the second program code such that the first and second executions do not overlap.

3. The system of claim 2, wherein the first time period comprises one of (i) a time by which the virtual compute system is requested to execute the first program code, (ii) a time after which the virtual compute system is requested to execute the first program code, or (iii) a temporal window within which the virtual compute system is requested to execute the first program code.

4. A system, comprising:
a virtual compute system comprising one or more hardware computing devices executing specific computer-executable instructions and configured to at least:
maintain a plurality of virtual machine instances on one or more physical computing devices;
monitor incoming code execution requests to execute program codes on the virtual compute system;
determine whether at least some of the incoming code execution requests exhibit periodicity, the at least some of the incoming code execution requests associated with one or more execution parameters, wherein the periodicity indicates a time period at which a subsequent periodic request exhibiting the same periodicity as the at least some of the incoming code execution requests is expected to be received by the virtual compute system;
in response to determining that the at least some of the incoming code execution requests exhibit periodicity, cause a reduced number of virtual machine instances to be maintained by the virtual compute system, the reduced number determined based on the periodicity;
cause an additional virtual machine instance to be configured based on the one or more execution parameters before the time period at which the subsequent periodic request is expected to be received by the virtual compute system;
cause a program code associated with the at least some of the incoming code execution requests to be loaded on the additional virtual machine instance subsequent to causing the reduced number of virtual machine instances to be maintained and before the time period at which the subsequent periodic request is expected to be received by the virtual compute system; and
in response to receiving the subsequent periodic request, cause the program code loaded on the additional virtual machine instance to be executed.

5. The system of claim 4, wherein the plurality of virtual machine instances comprises an active pool of virtual machine instances, wherein the virtual compute system is configured to cause the reduced number of virtual machine instances to be maintained by the virtual compute system by removing from the active pool an instance that is no longer being used to execute a program code.

6. The system of claim 4, wherein the plurality of virtual machine instances comprises an active pool of virtual machine instances, and wherein the virtual compute system is further configured to cause the additional virtual machine instance to be configured based on the one or more execution parameters by:
requesting the additional virtual machine instance from an instance provisioning service in networked communication with the virtual compute system;
causing the additional virtual machine instance to be added to the active pool; and
creating a container on the additional virtual machine instance and causing the program code associated with the subsequent periodic request to be loaded in the container.

7. The system of claim 4, wherein the plurality of virtual machine instances comprises a warming pool of virtual machine instances, and wherein the virtual compute system is further configured to cause the additional virtual machine instance to be configured based on the one or more execution parameters by:
requesting the additional virtual machine instance from an instance provisioning service in networked communication with the virtual compute system;
causing the additional virtual machine instance to be added to the warming pool; and
creating a container on the additional virtual machine instance and causing the program code associated with the subsequent periodic request to be loaded in the container.

8. The system of claim 4, wherein the plurality of virtual machine instances comprises an active pool of virtual machine instances, and wherein the virtual compute system is further configured to cause the additional virtual machine instance to be configured based on the one or more execution parameters by:
locating the additional virtual machine instance in the active pool, wherein the additional virtual machine instance is not fully utilized; and
creating a container on the additional virtual machine instance and causing a program code associated with the subsequent periodic request to be loaded in the container.

9. The system of claim 4, wherein the plurality of virtual machine instances comprises a warming pool of virtual machine instances having one or more software components loaded thereon and waiting to be assigned to an account, and wherein the virtual compute system is configured to cause a reduced number of virtual machine instances to be maintained by the virtual compute system by refraining from adding additional virtual machine instances to the warming pool until a number of virtual machine instances in the warming pool reaches a number corresponding to the reduced number amount.

10. The system of claim 4, wherein the virtual compute system is further configured to, in response to receiving the subsequent periodic request, cause a program code associated with the subsequent periodic request to be executed in a container created on the additional virtual machine instance, wherein the program code is loaded in the container before the subsequent periodic request is received by the virtual compute system.

11. The system of claim 4, wherein the virtual compute system is further configured to:

receive a first job request associated with a first program code, a first maximum duration for executing the first program code, and a first time frame for executing the first program code;
receive a second job request associated with a second program code and a second time frame for executing the second program code, the second time frame at least partially overlapping the first time frame; and
determine a first execution time at which the first program code is to be executed and a second execution time at which the second program code is to be executed such that the first execution time precedes the second execution time at least by the first maximum duration.

12. The system of claim 11, wherein the virtual compute system is further configured to provide, via a user interface, an option of selecting between a first degree of temporal flexibility associated with a first cost and a second degree of temporal flexibility that is greater than the first degree and associated with a second cost, wherein the first cost is greater than the second cost.

13. The system of claim 4, wherein the virtual compute system is configured to determine whether at least some of the incoming code execution requests exhibit periodicity by periodically analyzing log data generated based on the incoming code execution requests.

14. A computer-implemented method comprising:
as implemented by one or more computing devices configured with specific executable instructions,
maintaining a plurality of virtual machine instances on one or more physical computing devices;
monitoring incoming code execution requests to execute program codes on the virtual compute system;
determining whether at least some of the incoming code execution requests exhibit periodicity, the at least some of the incoming code execution requests associated with one or more execution parameters, wherein the periodicity indicates a time period at which a subsequent periodic request exhibiting the same periodicity as the at least some of the incoming code execution requests is expected to be received by the virtual compute system;
in response to determining that the at least some of the incoming code execution requests exhibit periodicity, causing a reduced number of virtual machine instances to be maintained by the virtual compute system, the reduced number determined based on the periodicity;
causing an additional virtual machine instance to be configured based on the one or more execution parameters before the time period at which the subsequent periodic request is expected to be received by the virtual compute system;
causing a program code associated with the at least some of the incoming code execution requests to be loaded on the additional virtual machine instance subsequent to causing the reduced number of virtual machine instances to be maintained and before the time period at which the subsequent periodic request is expected to be received by the virtual compute system; and
in response to receiving the subsequent periodic request, causing the program code loaded on the additional virtual machine instance to be executed.

15. The computer-implemented method of claim 14, wherein the plurality of virtual machine instances comprise an active pool of virtual machine instances, and wherein causing the additional virtual machine instance to be configured based on the one or more execution parameters comprises;
requesting the additional virtual machine instance from an instance provisioning service in networked communication with the virtual compute system;
causing the additional virtual machine instance to be added to the active pool; and
creating a container on the additional virtual machine and causing a program code associated with the at least some of the incoming code execution requests to be loaded in the container.

16. The computer-implemented method of claim 14, wherein the plurality of virtual machine instances comprise a warming pool of virtual machine instances, and wherein causing the additional virtual machine instance to be configured based on the one or more execution parameters comprises:
requesting the additional virtual machine instance from an instance provisioning service in networked communication with the virtual compute system;
causing the additional virtual machine instance to be added to the warming pool; and
creating a container on the additional virtual machine and causing a program code associated with the subsequent periodic request to be loaded in the container.

17. The computer-implemented method of claim 14, further comprising:
receiving a request to execute a first job associated with a first set of execution requirements;
receiving a request to execute a second job associated with a second set of execution requirements;
determining one or more scheduling criteria based on the first and second sets of execution requirements; and
determining a first execution time for executing the first job and a second execution time for executing the second job such that the one or more scheduling criteria are satisfied.

18. Non-transitory physical computer storage comprising instructions that, when executed by one or more computing devices, configure the one or more computing devices to:
maintain a plurality of virtual machine instances on one or more physical computing devices;
monitor incoming code execution requests to execute program codes on the virtual compute system;
determine whether at least some of the incoming code execution requests exhibit periodicity, the at least some of the incoming code execution requests associated with one or more execution parameters, wherein the periodicity indicates a time period at which a subsequent periodic request exhibiting the same periodicity as the at least some of the incoming code execution requests is expected to be received by the virtual compute system;
in response to determining that the at least some of the incoming code execution requests exhibit periodicity, cause a reduced number of virtual machine instances to be maintained by the virtual compute system, the reduced number determined based on the periodicity;
cause an additional virtual machine instance to be configured based on the one or more execution parameters before the time period at which the subsequent periodic request is expected to be received by the virtual compute system;
cause a program code associated with the at least some of the incoming code execution requests to be loaded on the additional virtual machine instance subsequent to causing the reduced number of virtual machine instances to be maintained and before the time period at which the subsequent periodic request is expected to be received by the virtual compute system; and in response to receiving the subsequent periodic request, cause the program code loaded on the additional virtual machine instance to be executed.

19. The non-transitory physical computer storage of claim 18, wherein the plurality of virtual machine instances comprise an active pool of virtual machine instances, and wherein causing the additional virtual machine instance to be configured based on the one or more execution parameters comprises:

requesting the additional virtual machine instance from an instance provisioning service in networked communication with the virtual compute system;

causing the additional virtual machine instance to be added to the active pool; and creating a container on the additional virtual machine and causing a program code associated with the subsequent periodic request exhibiting the same periodicity as the at least some of the incoming code execution requests to be loaded in the container.

20. The non-transitory physical computer storage of claim 18, wherein the plurality of virtual machine instances comprise an active pool of virtual machine instances, and wherein causing the additional virtual machine instance to be configured based on the one or more execution parameters comprises:

locating the additional virtual machine instance in the active pool, wherein the additional virtual machine instance is not fully utilized; and creating a container on the additional virtual machine instance and causing a program code associated with the subsequent periodic request to be loaded in the container.

21. The non-transitory physical computer storage of claim 18, wherein the instructions further configure the one or more computing devices to:

receive a request to execute a first job associated with a first set of execution requirements;

receive a request to execute a second job associated with a second set of execution requirements;

determine one or more scheduling criteria based on the first and second sets of execution requirements; and determine a first execution time for executing the first job and a second execution time for executing the second job such that the one or more scheduling criteria are satisfied.

* * * * *